(12) United States Patent
Watanabe

(10) Patent No.: US 11,126,005 B2
(45) Date of Patent: Sep. 21, 2021

(54) HEAD UP DISPLAY SYSTEM FOR EXPANDING A DISPLAY RANGE OF A VIRTUAL IMAGE

(71) Applicant: MAXELL, LTD., Kyoto (JP)

(72) Inventor: Toshimitsu Watanabe, Kyoto (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 16/343,586

(22) PCT Filed: Oct. 24, 2017

(86) PCT No.: PCT/JP2017/038381
§ 371 (c)(1),
(2) Date: Apr. 19, 2019

(87) PCT Pub. No.: WO2018/079559
PCT Pub. Date: May 3, 2018

(65) Prior Publication Data
US 2020/0050001 A1 Feb. 13, 2020

(30) Foreign Application Priority Data
Oct. 24, 2016 (JP) .............................. JP2016-207992

(51) Int. Cl.
*G02B 27/01* (2006.01)
*B60K 35/00* (2006.01)

(52) U.S. Cl.
CPC .......... *G02B 27/0179* (2013.01); *B60K 35/00* (2013.01); *G02B 27/0101* (2013.01);
(Continued)

(58) Field of Classification Search
CPC ............ G02B 27/0179; G02B 27/0101; G02B 2027/0196; G02B 2027/0187;
(Continued)

(56) References Cited

U.S. PATENT DOCUMENTS 4,714,320 A * 12/1987 Banbury ............ G02B 27/0101
345/9
6,243,207 B1 * 6/2001 Kawamura .......... H04N 13/322
359/630
(Continued)

FOREIGN PATENT DOCUMENTS

JP 2003-107391 A 4/2003
JP 2013-148901 A 8/2013
(Continued)

OTHER PUBLICATIONS

International Search Report dated Jan. 16, 2018 for the PCT International Application No. PCT/JP2017/038381.
(Continued)

*Primary Examiner* — Chad M Dicke
(74) *Attorney, Agent, or Firm* — Volpe Koenig

(57) ABSTRACT

First and second head up displays are installed so an angle $\phi$ at which a first and second center line intersect is $\phi=\theta+\alpha$ and a distance PD between a first and second virtual emission point, is $PD=L(M-L(W-D)/(H-W))/W$. The $\alpha$ is $\alpha=\arctan(W/2L)$, the $\theta$ is an angle of view of first or second virtual emission point, the W is a length of an eye box in a width direction of a vehicle, the L is a distance from an eye point to a virtual image plane, the M is a distance from the eye point to a point where a virtual image cannot be seen, the D is an interval between both eyes, and the H is a length of the virtual image plane on which the virtual image is displayed, in the width direction of the vehicle.

6 Claims, 18 Drawing Sheets

(52) U.S. Cl.
CPC .......................... *B60K 2370/1529* (2019.05);
*B60K 2370/785* (2019.05); *G02B 2027/014*
(2013.01); *G02B 2027/0187* (2013.01); *G02B*
*2027/0196* (2013.01)

(58) Field of Classification Search
CPC .............. G02B 2027/014; B60K 35/00; B60K
2370/1529; B60K 2370/785
See application file for complete search history.

(56) References Cited

U.S. PATENT DOCUMENTS

| | | | | |
|---|---|---|---|---|
| 10,018,841 | B1* | 7/2018 | Chen | G02B 27/0101 |
| 10,234,683 | B2* | 3/2019 | Okayama | B60R 11/02 |
| 10,247,941 | B2* | 4/2019 | Fursich | G02B 27/0093 |
| 10,302,943 | B2* | 5/2019 | Asai | G09G 5/10 |
| 10,338,397 | B1* | 7/2019 | Seo | B60K 35/00 |
| 10,371,942 | B2* | 8/2019 | Yamamoto | G02B 13/16 |
| 10,409,077 | B2* | 9/2019 | Roberts | G02B 27/141 |
| 10,549,638 | B2* | 2/2020 | Suzuki | B60K 35/00 |
| 2005/0154505 | A1* | 7/2005 | Nakamura | G01C 21/365 |
| | | | | 701/1 |
| 2012/0243104 | A1* | 9/2012 | Chen | G02B 27/0101 |
| | | | | 359/633 |
| 2013/0187770 | A1 | 7/2013 | Moussa et al. | |
| 2014/0268353 | A1* | 9/2014 | Fujimura | G02B 27/0101 |
| | | | | 359/630 |
| 2015/0316765 | A1 | 11/2015 | Kim et al. | |
| 2016/0195727 | A1* | 7/2016 | Kuzuhara | B60K 35/00 |
| | | | | 359/633 |
| 2016/0202482 | A1 | 7/2016 | Kuzuhara et al. | |
| 2017/0192234 | A1* | 7/2017 | Lai | G02B 27/0101 |
| 2018/0299672 | A1* | 10/2018 | Yatsu | B60K 35/00 |
| 2018/0352204 | A1* | 12/2018 | Fujita | H04N 9/3147 |
| 2019/0025582 | A1* | 1/2019 | Morohashi | B60R 11/0229 |
| 2019/0293934 | A1* | 9/2019 | Asai | G02B 27/0101 |

FOREIGN PATENT DOCUMENTS

| | | |
|---|---|---|
| JP | 2015-011217 A | 1/2015 |
| WO | 2014/208330 A1 | 12/2014 |

OTHER PUBLICATIONS

Chinese Office Action dated Oct. 10, 2020 for Chinese Patent Application No. 201780060904.5.

* cited by examiner

HEAD UP DISPLAY SYSTEM FOR EXPANDING A DISPLAY RANGE OF A VIRTUAL IMAGE

TECHNICAL FIELD

The present invention relates to a technique for a head up display system, and particularly relates to a technique effectively applied to the space saving and the expansion of display range in a head up display system.

BACKGROUND ART

It has been known that a head up display (hereinafter, referred to as "HUD") that projects and displays information on a front windshield or the like is used in vehicles such as automobiles.

This HUD projects driving information such as vehicle speed and engine speed, information of car navigation or the like on the front windshield as described above. The driver can confirm the information without moving the line of sight to the so-called instrument panel incorporated in the dashboard, and it is possible to reduce the amount of movement of the line of sight.

In recent years, the HUD has been required to display various kinds of information for assisting the safe driving such as detection of pedestrians and obstacles in addition to the driving information and the information of car navigation mentioned above, so that the expansion of the display range in which virtual images are displayed has been required.

As the basic configuration of the HUD, an optically generated image is projected onto a front windshield through a mirror or the like, and the reflected image light enters the eyes of the driver, so that the driver visually recognizes the virtual image in front of the front windshield. Therefore, if the above-mentioned mirror for reflecting the image is enlarged, the display range can be expanded.

As for the display technique in this type of HUD, for example, a technique in which the projection direction is adjusted in line with the height of the eyes of the driver to reduce the distortion in the virtual image has been known (see, for example, Patent Document 1).

RELATED ART DOCUMENTS

Patent Documents

Patent Document 1: Japanese Patent Application Laid-open Publication No. 2003-107391

SUMMARY OF THE INVENTION

Problems to be Solved by the Invention

For example, when the mirror and others are enlarged in order to expand the display range of the HUD as described above, the projection unit that generates and projects the images is inevitably enlarged. This projection unit is installed in the console section on the back side of the dashboard in which meters on the driver's seat side such as a speedometer, a tachometer, a fuel gauge, a water temperature gauge, and a distance meter are contained.

Since there is a limitation in the space of this console section, if the projection unit is enlarged, there is a possibility that a problem that it becomes difficult to accommodate the projection unit in the console section or it becomes impossible to accommodate the projection unit in the console section may arise.

An object of the present invention is to provide the technique capable of expanding the display range of the virtual image without sacrificing the accommodability of the head up display system.

The above and other objects and novel features of the present invention will be apparent from the description of the present specification and the accompanying drawings.

Means for Solving the Problems

The following is a brief description of an outline of the typical invention disclosed in the present application.

Namely, a typical head up display system includes a first head up display and a second head up display configured to project an image to a windshield of a vehicle, thereby displaying a virtual image for a driver so as to be superimposed on a landscape in front of the vehicle.

The first and second head up displays are installed so that an angle $\phi$ at which a first center line which is an optical center line of the first head up display and a second center line which is an optical center line of the second head up display intersect is $\phi=\theta+\alpha$ and a distance PD between a first virtual emission point which is a virtual image emission point of the first head up display and a second virtual emission point which is a virtual image emission point of the second head up display is $PD=L(M-L(W-D)/(H-W))/W$.

The $\alpha$ is $\alpha=\arctan(W/2L)$, the $\theta$ is an angle of view of the first or second virtual emission point, the W is a length of an eye box in a width direction of the vehicle, the L is a distance from an eye point to a virtual image plane, the M is a distance from the eye point to a point where a virtual image cannot be seen, the D is an interval between both eyes, and the H is a horizontal display width of the virtual image plane.

In particular, the first head up display is installed so that the first center line enters at a right angle with respect to a windshield and reaches pupil positions of a driver. In addition, the second head up display is installed so that the second center line enters at an angle other than the right angle with respect to the windshield and reaches the pupil positions of the driver.

Effects of the Invention

The effects obtained by typical invention disclosed in the present application will be briefly described below.

That is, it is possible to expand a visual recognition region of a virtual image without sacrificing the accommodability of the head up display system.

BRIEF DESCRIPTIONS OF THE DRAWINGS

DETAILED DESCRIPTION OF PREFERRED EMBODIMENTS

Figure 1:
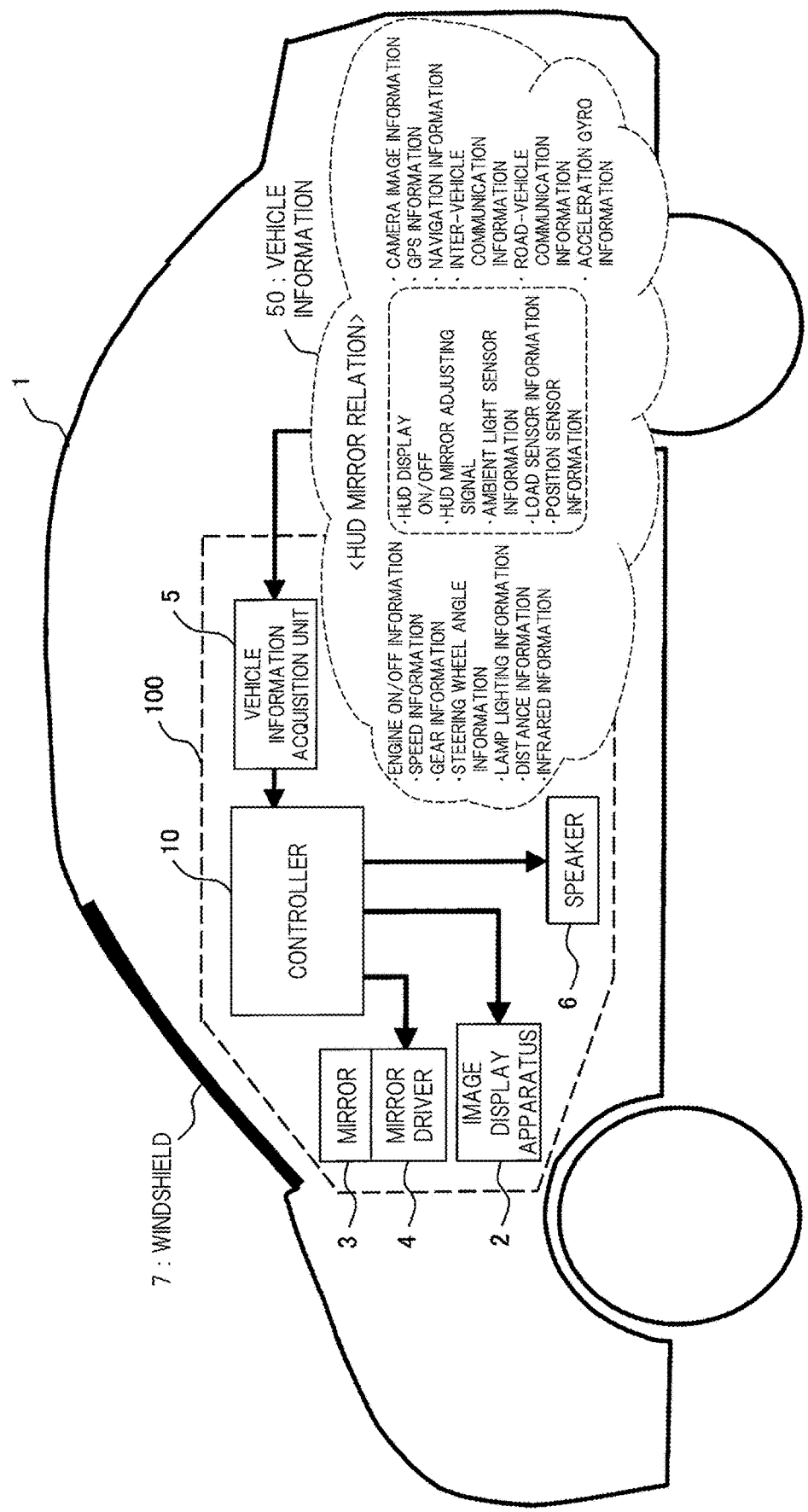
FIG. 1 is an explanatory diagram schematically showing a HUD provided in a HUD system according to a first embodiment.

The same components are denoted by the same reference characters in principle throughout the drawings for describing the embodiments, and the repetitive description thereof will be omitted. In addition, hatching is used even in a plan view so as to make the drawings easy to see.

First Embodiment

<Outline>

In a first embodiment, two HUDs are used to expand a display region of virtual image visually recognized by a driver. A HUD system unit capable of minimizing the increase in installation space of the two HUDs at that time by providing installation requirements of the two HUDs will be described.

Hereinafter, the embodiment will be described in detail.

<Basic Configuration Example of HUD>

The head up display system is configured to include two HUDs as described above. These two HUDs have the same configuration.

First, an outline of the configuration of the HUD provided in the head up display system will be described.

FIG. 1 is an explanatory diagram schematically showing the HUD provided in the HUD system according to the first embodiment.

The head up display system is configured to include two HUDs 100 each corresponding to the head up display shown in FIG. 1. As shown in FIG. 1, this HUD 100 is mounted in a vehicle 1. The HUD 100 projects an image light generated by an image display apparatus 2 to a windshield 7 which is a front glass of the vehicle 1 through a mirror 3.

The image light reflected by the windshield 7 enters the eyes of a driver, and the driver visually recognizes the image. The displayed image includes information relating to driving and assists the driving operation.

The HUD 100 includes a vehicle information acquisition unit 5, a controller 10, a mirror driver 4, a speaker 6 and others. The vehicle information acquisition unit 5 acquires various kinds of vehicle information 50. The controller 10 generates image information to be displayed based on the vehicle information 50 acquired by the vehicle information acquisition unit 5.

The mirror driver 4 drives the mirror 3. The speaker 6 outputs audio information to the driver. The vehicle information 50 includes operation signals by the driver such as a HUD display On/Off signal and a HUD mirror adjusting signal relating to the adjustment of the mirror 3 in addition to speed information and gear information indicating the operation state of the vehicle.

Figure 2:
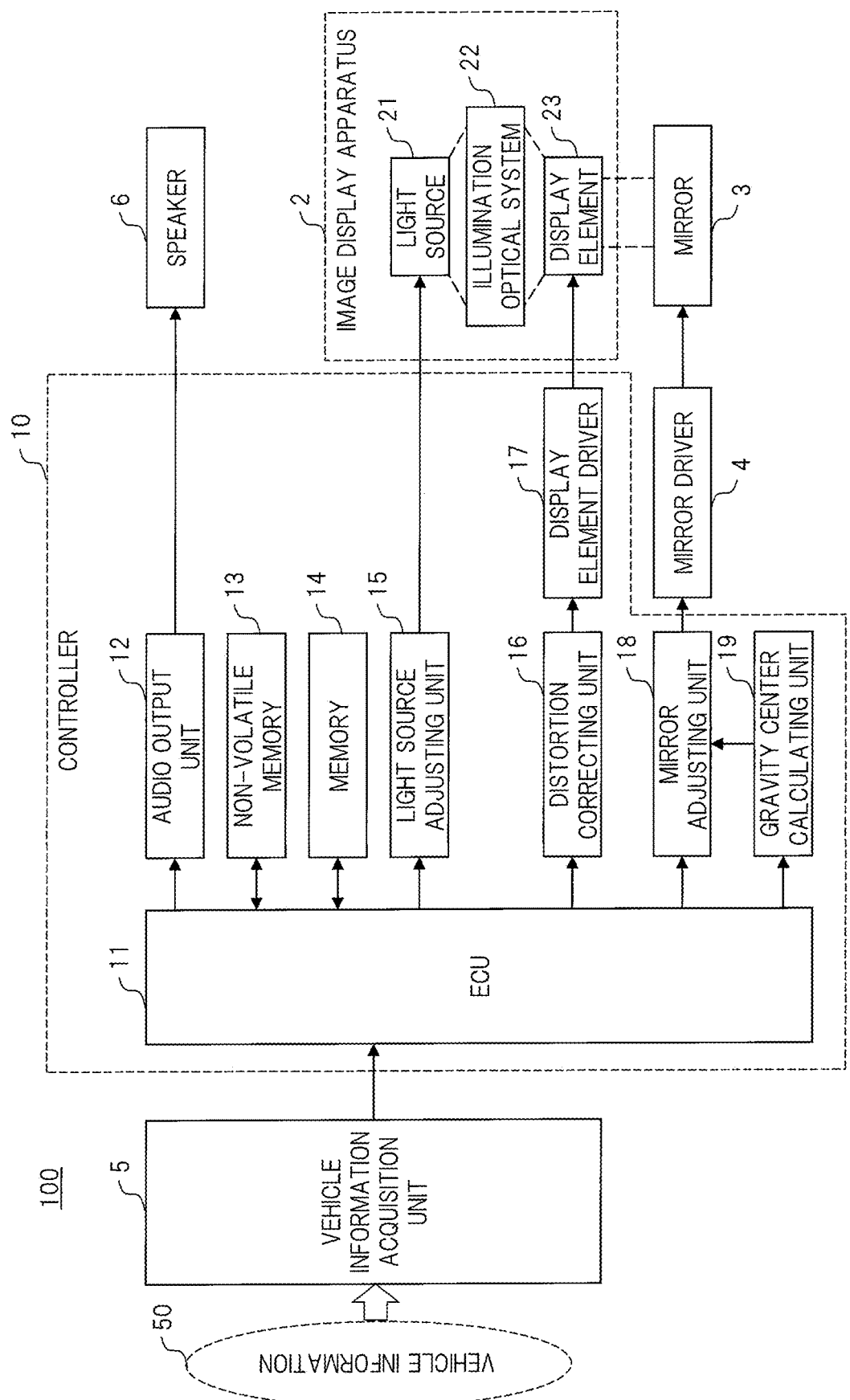
FIG. 2 is a block diagram showing an example of an internal configuration in the HUD in FIG. 1.

FIG. 2 is a block diagram showing an example of an internal configuration of the HUD 100 in FIG. 1.

The various kinds of vehicle information 50 acquired by the vehicle information acquisition unit 5 is transmitted to the controller 10. An ECU (Electronic Control Unit) 11 in the controller 10 generates an image signal displayed by the HUD 100 based on the input vehicle information 50. Also, the ECU 11 generates a control signal for the mirror 3 and an audio signal of the speaker 6 based on the vehicle information 50.

The image display apparatus 2 is composed of a light source 21 such as a LED (Light Emitting Diode) or laser, an illumination optical system 22, and a display element 23 such as a liquid crystal element, and emits the image light generated in the display element 23 to the mirror 3.

The controller 10 includes an audio output unit 12, a non-volatile memory 13, a memory 14, a light source adjusting unit 15, a distortion correcting unit 16, a display element driver 17, a mirror adjusting unit 18, a gravity center calculating unit 19 and others.

The audio output unit 12 outputs an audio signal to the speaker 6. The non-volatile memory 13 stores a program executed by the ECU 11. The memory 14 stores image information and control information. The light source adjusting unit 15 controls the light source 21 of the image display apparatus 2.

The distortion correcting unit 16 corrects the signal so as to cancel the projection distortion of the image to be displayed. The display element driver 17 drives the display element 23 based on the image signal corrected by the distortion correcting unit 16. The mirror adjusting unit 18 outputs a drive signal to the mirror driver 4. The gravity center calculating unit 19 calculates the position of center of gravity of the driver.

Figure 3:
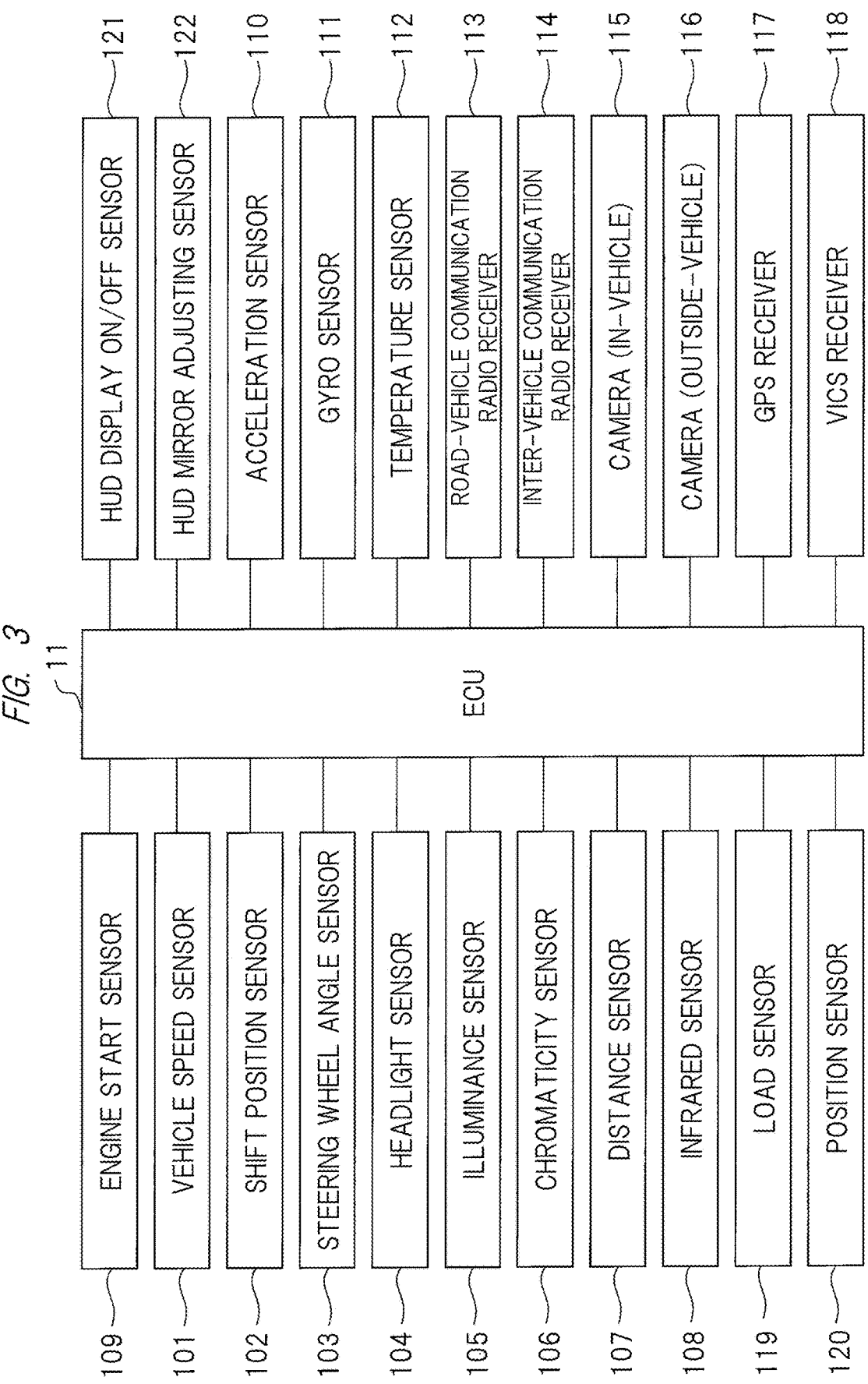
FIG. 3 is an explanatory diagram showing an example of hardware configuration for acquiring vehicle information in the HUD in FIG. 2.

FIG. 3 is an explanatory diagram showing an example of hardware configuration for acquiring the vehicle information 50 in the HUD 100 in FIG. 2.

Here, the hardware configuration of a part of the vehicle information acquisition unit 5 and the controller 10 will be mainly described. For example, the vehicle information 50 is acquired by information acquisition devices such as various sensors connected to the ECU 11 under the control of the ECU 11.

These information acquisition devices include, for example, a vehicle speed sensor 101, a shift position sensor 102, a steering wheel angle sensor 103, a headlight sensor 104, an illuminance sensor 105, a chromaticity sensor 106, a distance sensor 107, an infrared sensor 108, an engine start sensor 109, an acceleration sensor 110, a gyro sensor 111, a temperature sensor 112, a road-vehicle communication radio receiver 113, an inter-vehicle communication radio receiver 114, a camera (in-vehicle) 115, a camera (outside-vehicle) 116, a GPS (Global Positioning System) receiver 117, a VICS (Vehicle Information and Communication System: Registered Trademark (the same applies hereinafter)) receiver 118, a load sensor 119, a position sensor 120, a HUD display On/Off sensor 121, and a HUD mirror adjusting sensor 122.

It is not always necessary to include all of these devices, and other kinds of devices may be provided. It is possible to use the vehicle information 50 acquired depending on the provided devices as appropriate.

The vehicle speed sensor 101 acquires speed information of the vehicle 1. The shift position sensor 102 acquires current gear information of the vehicle 1. The steering wheel angle sensor 103 acquires steering wheel angle information.

The headlight sensor 104 acquires lamp lighting information relating to On/Off of the headlight. The illuminance sensor 105 and the chromaticity sensor 106 acquire ambient light information. The distance sensor 107 acquires distance information between the vehicle 1 and an external object.

The infrared sensor 108 acquires infrared information relating to the presence/absence of an object and the distance to the object within a short distance from the vehicle 1. The engine start sensor 109 detects engine On/Off information. The acceleration sensor 110 and the gyro sensor 111 acquire acceleration gyro information including acceleration and angular velocity as information of the attitude and behavior of the vehicle 1.

The temperature sensor 112 acquires temperature information inside and outside the vehicle. The road-vehicle communication radio receiver 113 and the inter-vehicle communication radio receiver 114 respectively acquire road-vehicle communication information received by the road-vehicle communication between the vehicle 1 and each of the road, the road sign, the road signal and the like and inter-vehicle communication information received by the inter-vehicle communication between the vehicle 1 and the other vehicle nearby.

The camera (in-vehicle) 115 and the camera (outside-vehicle) 116 respectively acquire camera image information (in-vehicle/outside-vehicle) by capturing moving images of the situation inside and outside the vehicle. The camera (in-vehicle) 115 captures, for example, the attitude of the driver and the positions and movement of the eyes of the driver. It is possible to grasp the fatigue state of the driver, the position of the line of sight of the driver and the like by analyzing the obtained moving images.

Also, the camera (outside-vehicle) 116 captures the surrounding situations in front and back of the vehicle 1. It is possible to grasp the presence/absence of moving objects nearby such as other vehicles and human, the building, the landform and the road surface state (rain, snow, freezing, irregularities and the like) by analyzing the obtained moving images.

The GPS receiver 117 and the VICS receiver 118 respectively acquire GPS information obtained by receiving the GPS signal and VICS information obtained by receiving the VICS signal. These receivers may be implemented as a part of a car navigation system that acquires and uses such information.

The load sensor 119 and the position sensor 120 detect the position and attitude of the driver. The HUD display On/Off sensor 121 detects whether the power supply of the HUD 100 is in an on state or an off state. The HUD mirror adjusting sensor 122 detects the HUD mirror adjusting signal and acquires information as to whether the mirror adjusting process is performed or not.

Although the various sensors have been described as being provided outside the HUD 100, the sensors relating to the HUD, for example, the HUD display On/Off sensor 121, the HUD mirror adjusting sensor 122 and the like may be provided inside the HUD 100.

<Example of Image Display of HUD>

Figure 4:
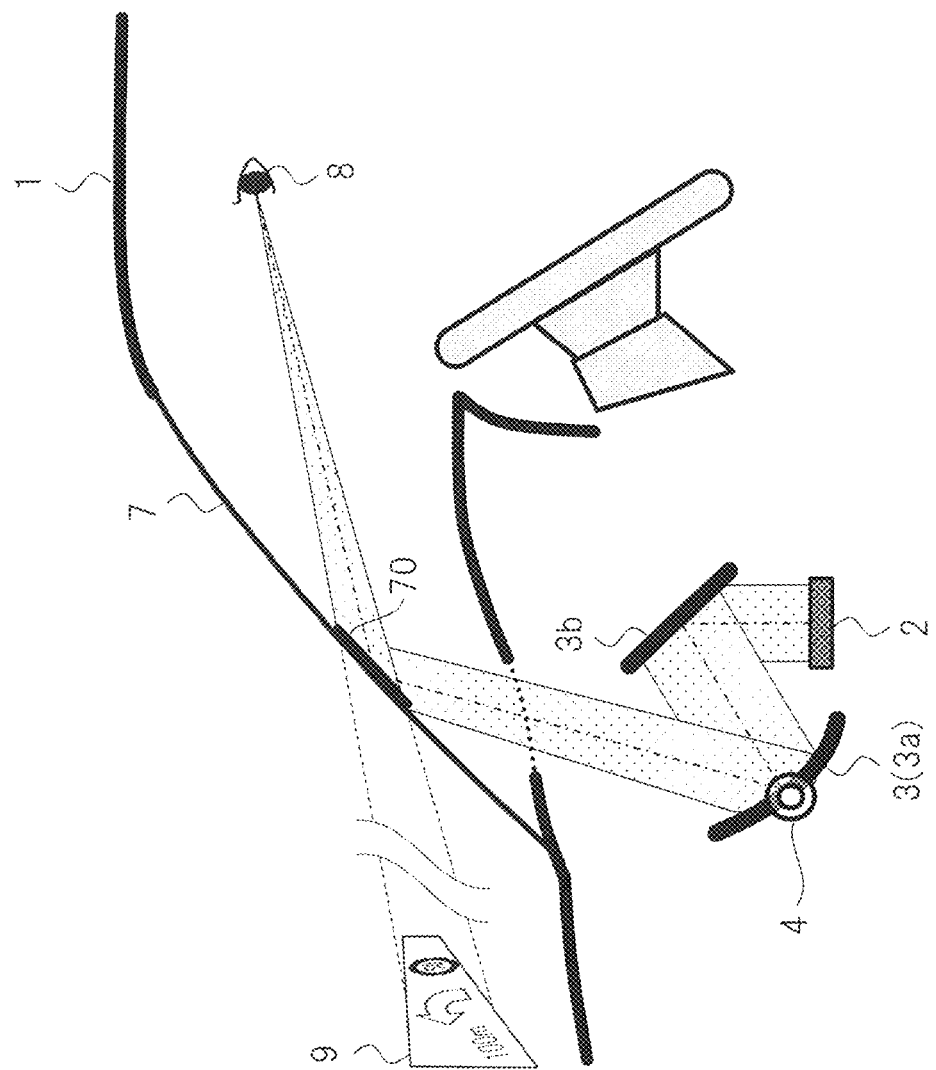
FIG. 4 is a schematic view showing an example of an image display state by the HUD in FIG. 1.

FIG. 4 is a schematic view showing an example of an image display state by the HUD in FIG. 1.

As shown in FIG. 4, the image display apparatus 2 is installed in a lower portion of the dashboard of the vehicle 1. The image light for display is emitted from the image display apparatus 2. The image light is reflected by a first mirror 3b and a second mirror 3a and is projected to the windshield 7.

The second mirror 3a is, for example, a concave mirror, a free-form surface mirror, a mirror having a shape asymmetrical to the optical axis or the like. The first mirror 3b is fixed, and the second mirror 3a is turnable by the mirror driver 4. In the following description, the second mirror 3a will be simply referred to as "mirror 3".

The image light converged and projected from the mirror 3 is reflected by the windshield 7 to enter an eye 8 of the driver and form an image on a retina, so that the driver can visually recognize the image. At that time, the driver sees a virtual image 9 present in front of the windshield 7. Namely, the driver sees the virtual image 9 in a forward direction of a reflection position 70. Here, the reflection position 70 indicates a reflection position of the image light on the windshield 7.

<Basic Operation of HUD>

Figure 5:
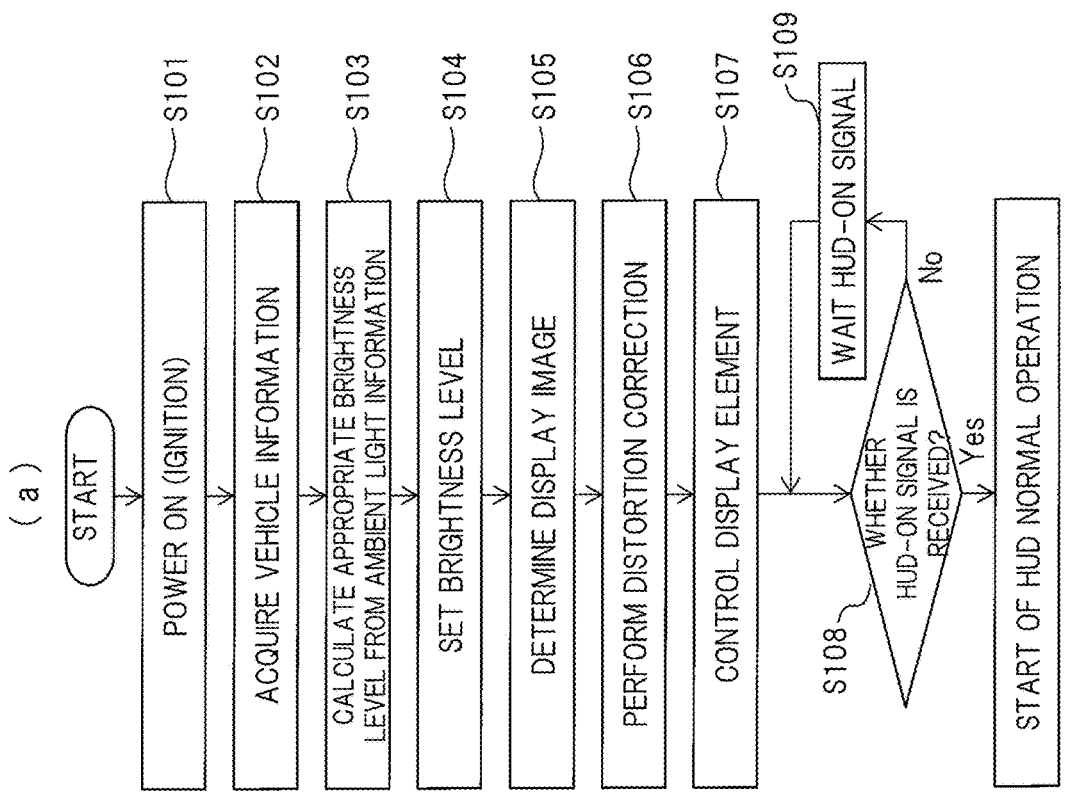
FIG. 5 is a flowchart showing an example of a basic operation of the HUD.

FIG. 5 is a flowchart showing an example of a basic operation of the HUD.

FIG. 5(a) shows an example of an initial operation in the HUD 100, and FIG. 5(b) shows an example of a normal operation including various adjustments in the HUD 100.

The following process is controlled by the ECU 11 of the controller 10 shown in FIG. 2.

First, in the initial operation shown in FIG. 5(a), when a power-on (ignition) signal is received by the engine start sensor 109 (S101), the vehicle information acquisition unit 5 receives the vehicle information 50 (S102).

Subsequently, an appropriate brightness level is calculated from the ambient light information of the illuminance sensor 105 (S103), and the brightness level of the light source 21 is set by controlling the light source adjusting unit 15 (S104). In addition, the information selected by the driver from the acquired vehicle information 50, for example, the current vehicle speed information is extracted, and the information to be displayed is determined (S105).

The distortion correcting unit 16 corrects the distortion of the display image caused by the curved shape of a projection optical system, for example, the windshield 7 (S106). The display element driver 17 supplies the drive signal to the display element 23 (S107).

It is determined whether an On signal is received by the HUD display On/Off sensor 121 (S108), and the HUD 100 is in a standby state until receiving the On signal (S109). When receiving the On signal, the light source 21 of the image display apparatus 2 is turned on, and the image projection display, that is, the normal operation of the HUD 100 is started.

Then, in the normal operation in FIG. 5(b), the vehicle information 50 is continuously acquired via the vehicle information acquisition unit 5 (S111). It is determined whether the mirror adjusting signal is received from the HUD mirror adjusting sensor 122 (S112), and the mirror adjusting process is performed when received (S113).

In the mirror adjusting process, an angle of the mirror 3 and others are adjusted by the mirror driver 4. Thereafter, a brightness level adjusting process of the display image (S114) and a display image changing process (S115) are performed to update the display by controlling the display element (S116).

It is determined whether an Off signal is received by the HUD display On/Off sensor 121 (S117), and the process from S111 is repeated until receiving the Off signal. When receiving the Off signal, the light source 21 of the image display apparatus 2 is turned off, and the image projection display is finished (S118).

<Process Example of Basic Operation of HUD>

Figure 6:
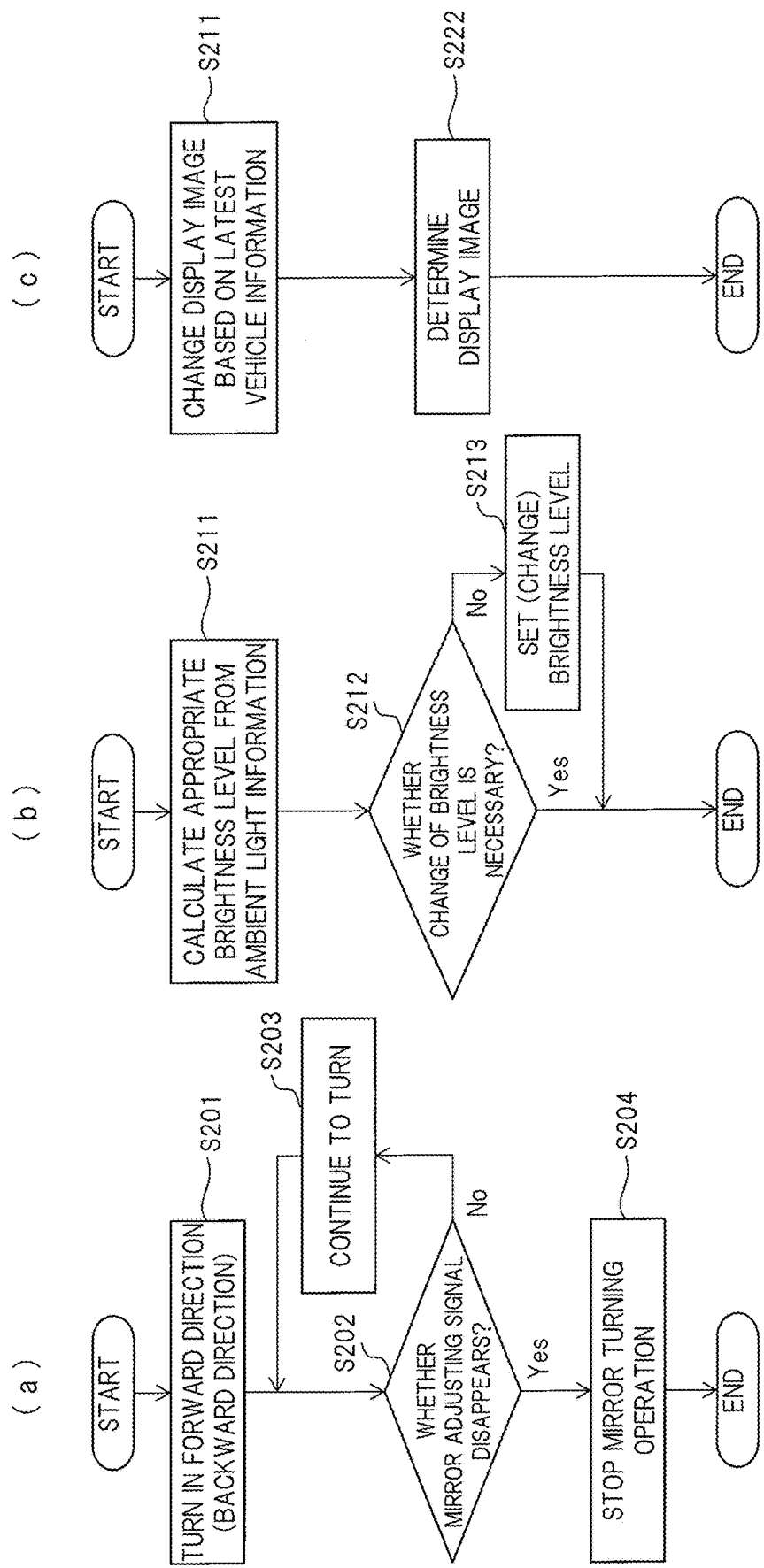
FIG. 6 is a flowchart showing details of the process in FIG. 5.

FIG. 6 is a flowchart showing details of the process in FIG. 5. FIG. 6(a) shows a process example in the mirror adjusting process (S113) in FIG. 5(b). FIG. 6(b) shows a process example in the brightness level adjusting process (S114) in FIG. 5(b). FIG. 6(c) shows a process example in the display image changing process (S115) in FIG. 5(b).

In the mirror adjusting process in FIG. 6(a), when the mirror adjusting signal is received from the HUD mirror adjusting sensor 122 by the operation of the driver, the mirror adjusting unit 18 determines the adjusting amount and the mirror driver 4 turns the mirror 3 in a forward direction or a backward direction (S201).

It is determined whether the mirror adjusting signal disappears (S202), and the mirror driver 4 continues to turn the mirror 3 during the period when receiving the signal (S203). When the driver stops the operation and the signal disappears, the turning operation of the mirror 3 is stopped (S204) and the adjusting process is finished.

The driver can select the turning direction (forward/backward) of the mirror 3 in S201. Alternatively, it is also possible to configure the mirror 3 so as to switch the turning direction (forward/backward) automatically when reaching the turning end. Accordingly, the driver can adjust the mirror 3 to the optimum angle while watching the display image of the HUD 100.

In the brightness level adjusting process in FIG. 6(b), the appropriate brightness level is calculated from the current ambient light information by the illuminance sensor 105 (S211). It is determined whether the change in the brightness level is necessary (S212), and when the change is necessary, the brightness level of the light source 21 is changed and set by controlling the light source adjusting unit 15 (S213). The adjustment of the brightness level is thus finished, and the image is displayed at the changed brightness level afterward.

In the display image changing process in FIG. 6(c), contents of the display image are changed based on the latest vehicle information 50 (S221). For example, the displayed speed is changed based on the current speed information from the vehicle speed sensor, and the guide arrow display is changed based on the navigation information from the GPS receiver and the VICS receiver.

Of course, the driver can select the items to be displayed, and when the items to be displayed are changed, the display is switched to the contents corresponding to the new items. By determining the display image based on the latest information and supplying it to the display element 23 (S222) in the manner described above, the changing process is finished.

The basic configuration and the basic operation of the HUD 100 have been described above.

<Installation Example of HUD>

Subsequently, an installation example of two HUDs 100 provided in the HUD system will be described.

The description of the installation and the display range of the HUD 100 will be complicated if the description is based on the configuration of the optical system shown in FIG. 4. Therefore, the following description is based on the configuration obtained by developing the optical system simply to be linear by replacing the concave mirror, that is, the mirror 3 in FIG. 4 with a convex lens 30.

Further, FIGS. 7 to 18 below show the position of the convex lens 30, that is, the mirror 3 in FIG. 4 seen from the roof side of the vehicle 1.

Figure 7:
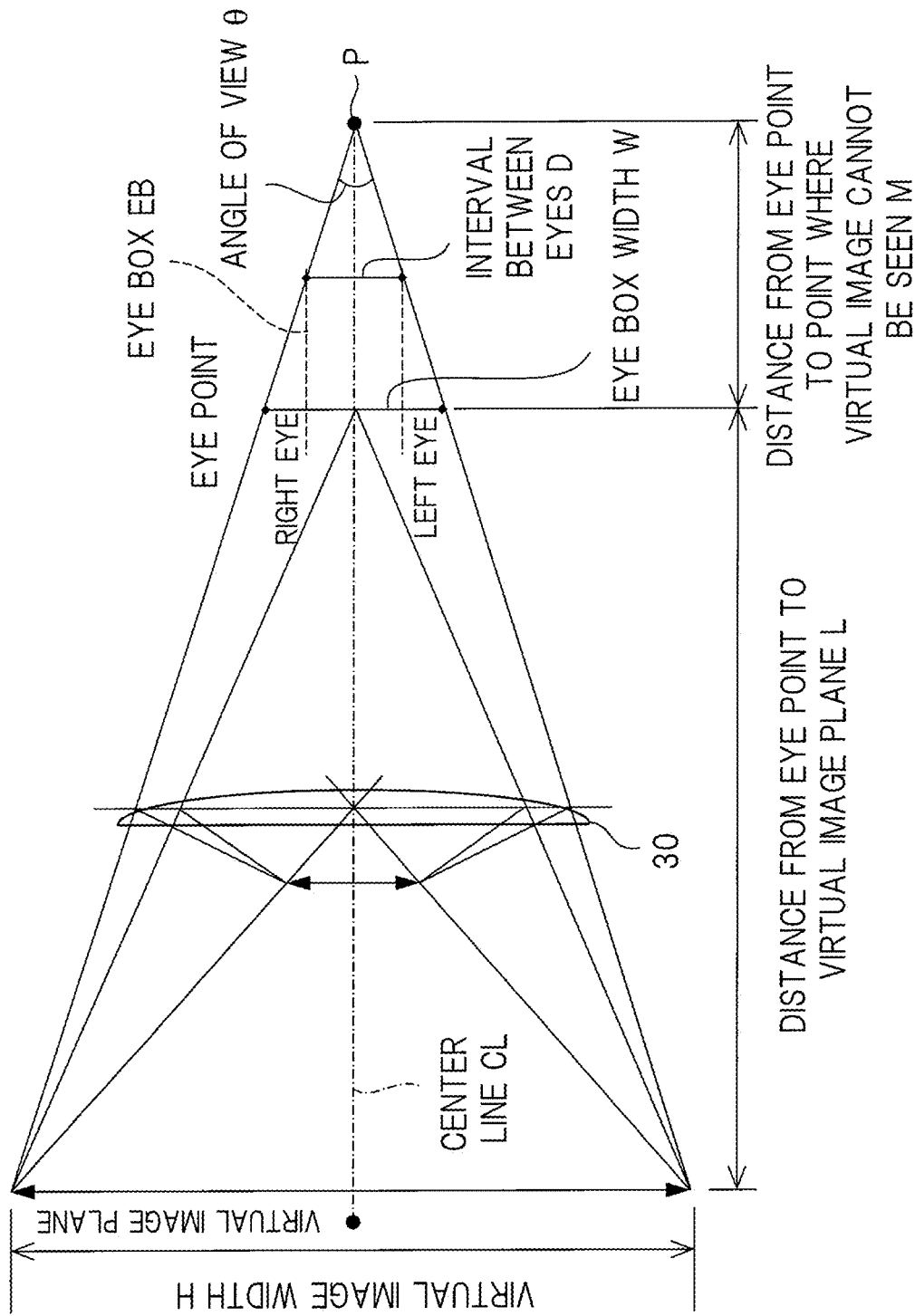
FIG. 7 is an explanatory diagram showing the optical system in FIG. 4 simply developed to be linear.

FIG. 7 is an explanatory diagram showing the optical system in FIG. 4 simply developed to be linear. FIGS. 8 to 18 below are also explanatory diagrams each showing the optical system simply developed to be linear in the same manner.

Hereinafter, the definitions in the HUD will be described with reference to FIG. 7, and FIGS. 8 to 18 will be described based on the definitions shown in FIG. 7.

In FIG. 7, a virtual emission point P is a point light source that emits a virtual image, and is an image light generated by the image display apparatus 2 in FIG. 4. An eye box EB is a region in which the driver can capture the virtual image.

An eye box width W is a length in a width direction (width direction of the vehicle 1) in which the driver can visually recognize the virtual image of the display information in the eye box EB. When eye point of the driver moves toward the virtual emission point P than the eye box width W, the driver cannot visually recognize the virtual image with both eyes.

Also, behind the virtual emission point P, the virtual image cannot be visually recognized even with one eye. A virtual image width H is a length of a virtual image plane on which the virtual image 9 is displayed in the width direction of the vehicle. A center line CL is a line connecting the eye point and the center of the virtual image plane to be displayed, and is an optical center line.

Here, a case in which two HUDs are simply installed in order to expand the display range of the virtual image will be described.

Figure 8:
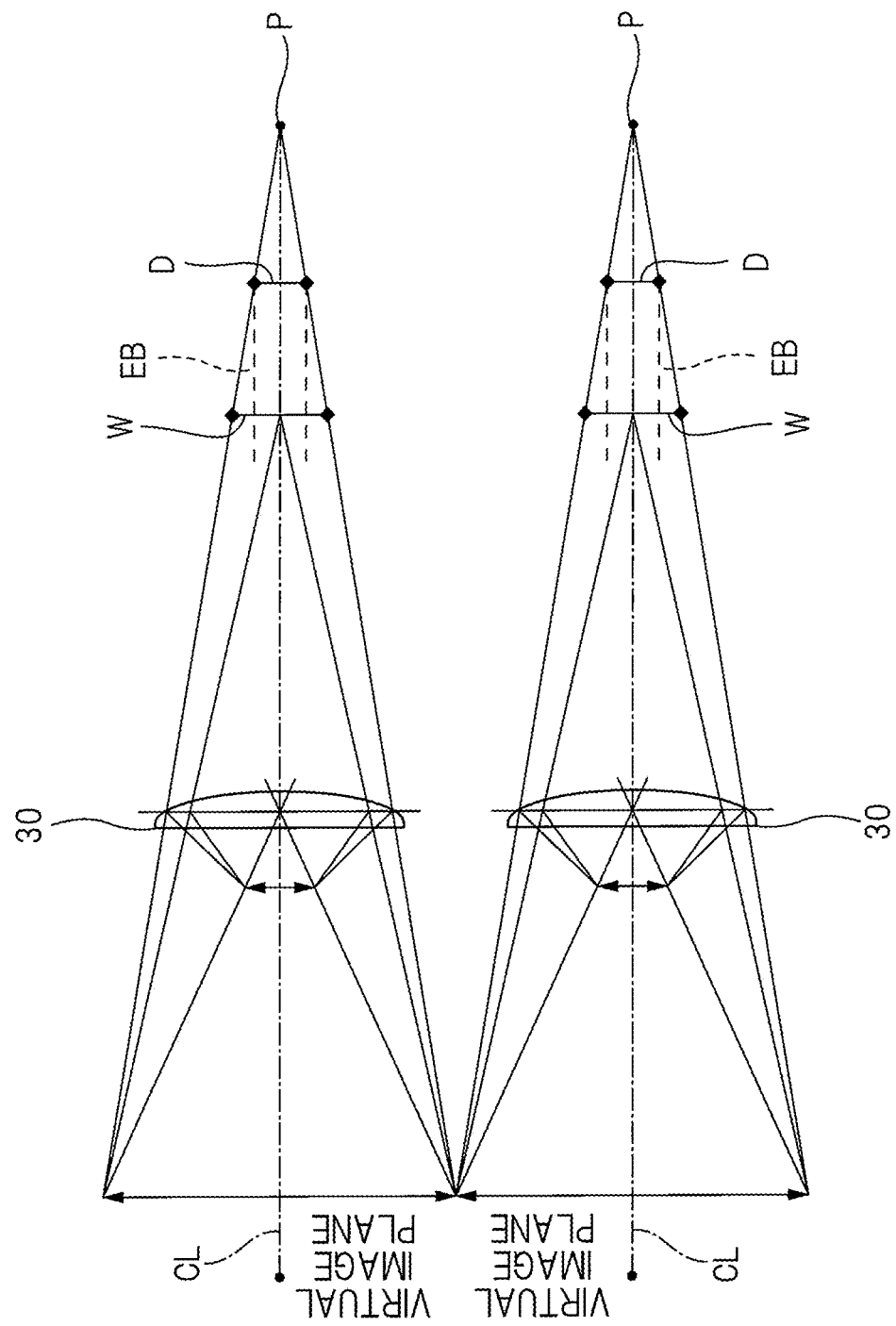
FIG. 8 is an explanatory diagram showing an installation example of HUDs according to the study by the inventor.

FIG. 8 is an explanatory diagram showing an installation example of HUDs according to the study by the inventor.

FIG. 8 shows an example in which the two HUDs are simply installed, and is an explanatory diagram showing the optical system simply developed to be linear as shown in FIG. 7.

When the two HUDs having the same configuration are simply installed in the width direction of the vehicle 1 so that the display ranges, that is, the virtual image planes displayed by the two HUDs are connected, the positions of the two eye boxes EB are separated from each other as shown in FIG. 8. In other words, this is the configuration in which the two convex lenses 30 are installed in the width direction of the vehicle 1.

In order for the driver to visually recognize the virtual images displayed by both HUDs at once, it is necessary to overlap the eye boxes EB in the HUDs. Therefore, in the case of FIG. 8, the driver can visually recognize the virtual images of the two HUDs individually, but cannot visually recognize the virtual images displayed by both HUDs at once.

Figure 9:
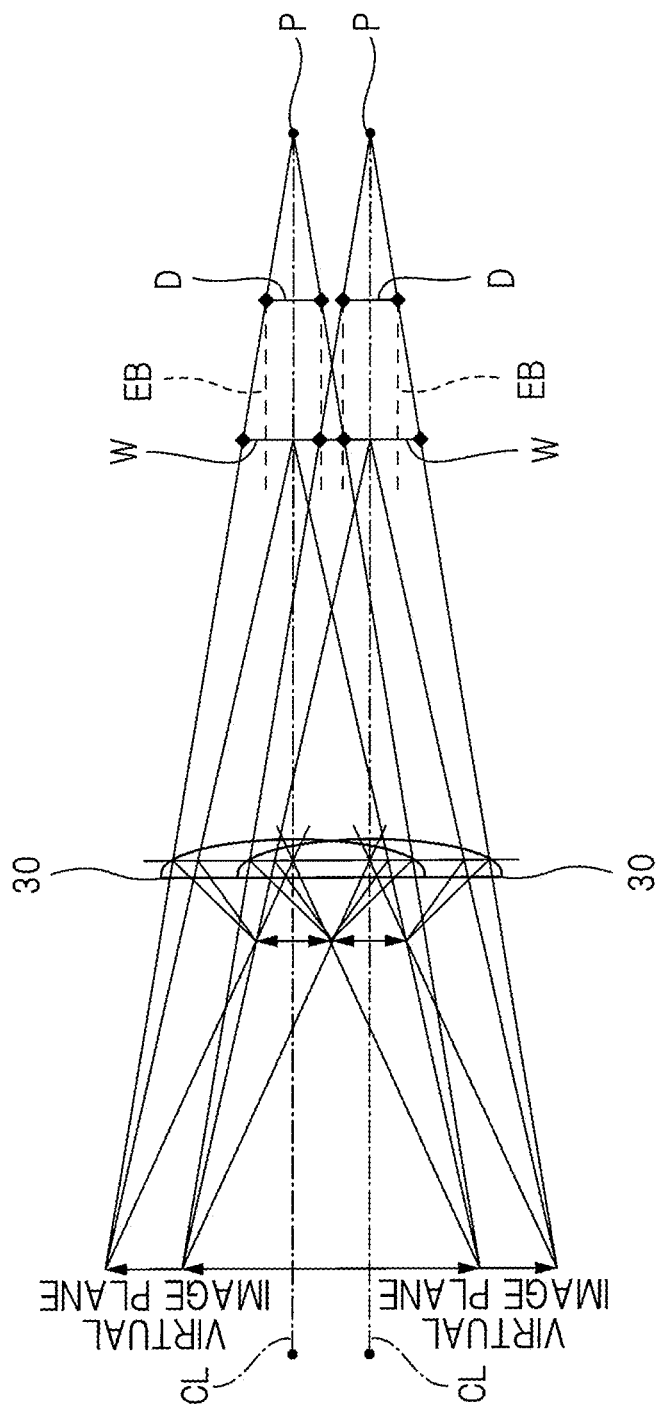
FIG. 9 is an explanatory diagram showing another installation example of the HUDs in FIG. 8.

FIG. 9 is an explanatory diagram showing another installation example of the HUDs in FIG. 8.

FIG. 9 shows an example in which the two HUDs are installed so that the eye boxes EB are overlapped.

In this case, as shown in FIG. 9, since the eye boxes EB are overlapped with each other, the driver can visually recognize the virtual images displayed by the two HUDs. As a result, the display range for displaying the virtual image is expanded.

However, when the two eye boxes EB are overlapped with each other, the convex lenses 30 of the HUDs, that is, the mirrors 3 in FIG. 4 are overlapped and interfere with each other as shown in FIG. 9, and it is impossible to simply install the two HUDs side by side in the width direction of the vehicle 1 in reality.

Figure 10:
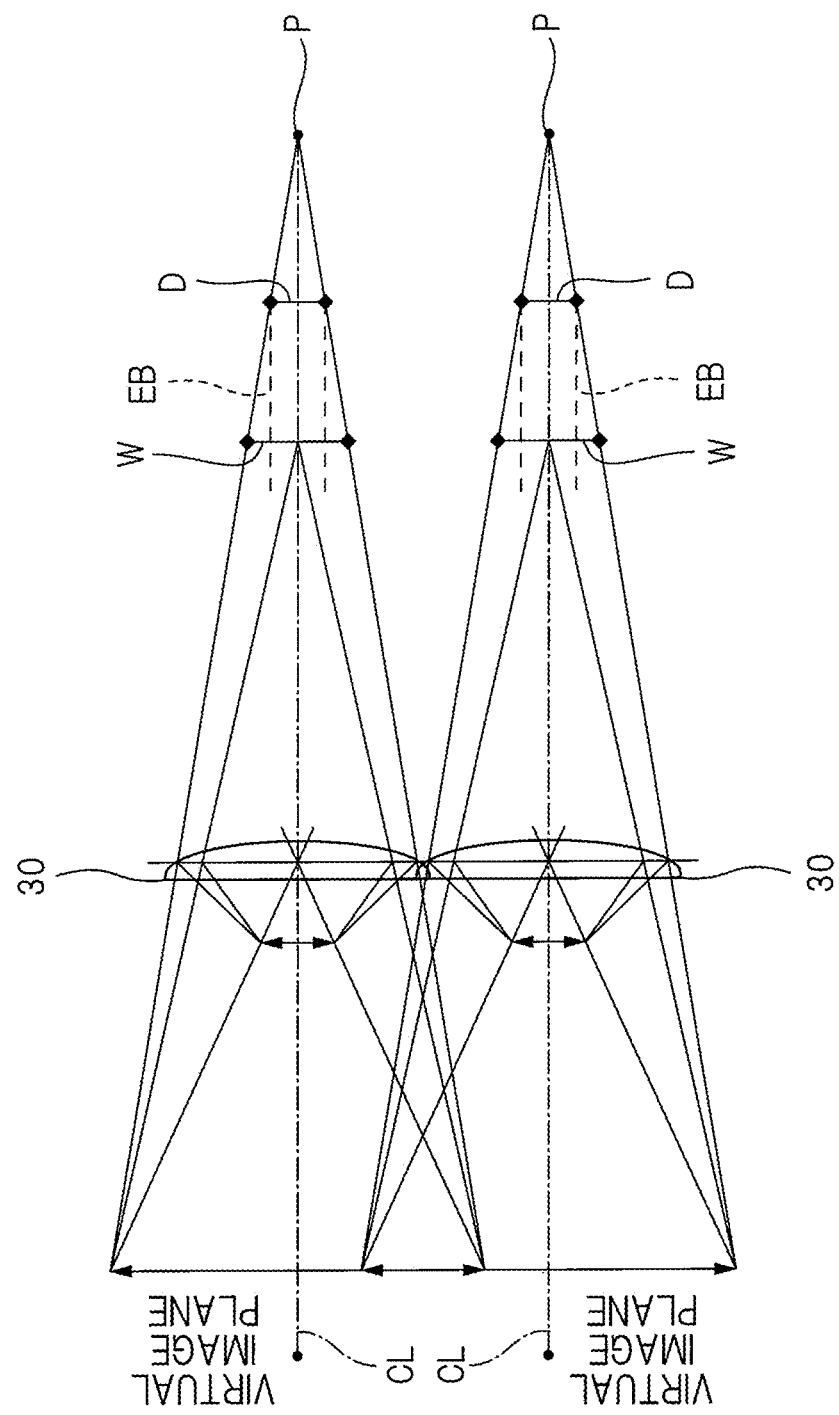
FIG. 10 is an explanatory diagram showing another installation example of the HUDs in FIG. 9.

FIG. 10 is an explanatory diagram showing another installation example of the HUDs in FIG. 9.

FIG. 10 shows a positional relationship of the two convex lenses 30 and the two eye boxes EB and shows the example in which the two convex lenses 30 are installed in contact with each other. As shown in FIG. 10, even when the two convex lenses 30 are installed so as to be in contact with each other, the eye boxes are not overlapped with each other, and it can be seen that the visual recognition region of the virtual image cannot be expanded even by simply installing the two HUDs in parallel.

Thus, the technique of expanding the visual recognition region of the virtual image by installing the flat surfaces of the two convex lenses 30 at an angle will be studied.

Figure 11:
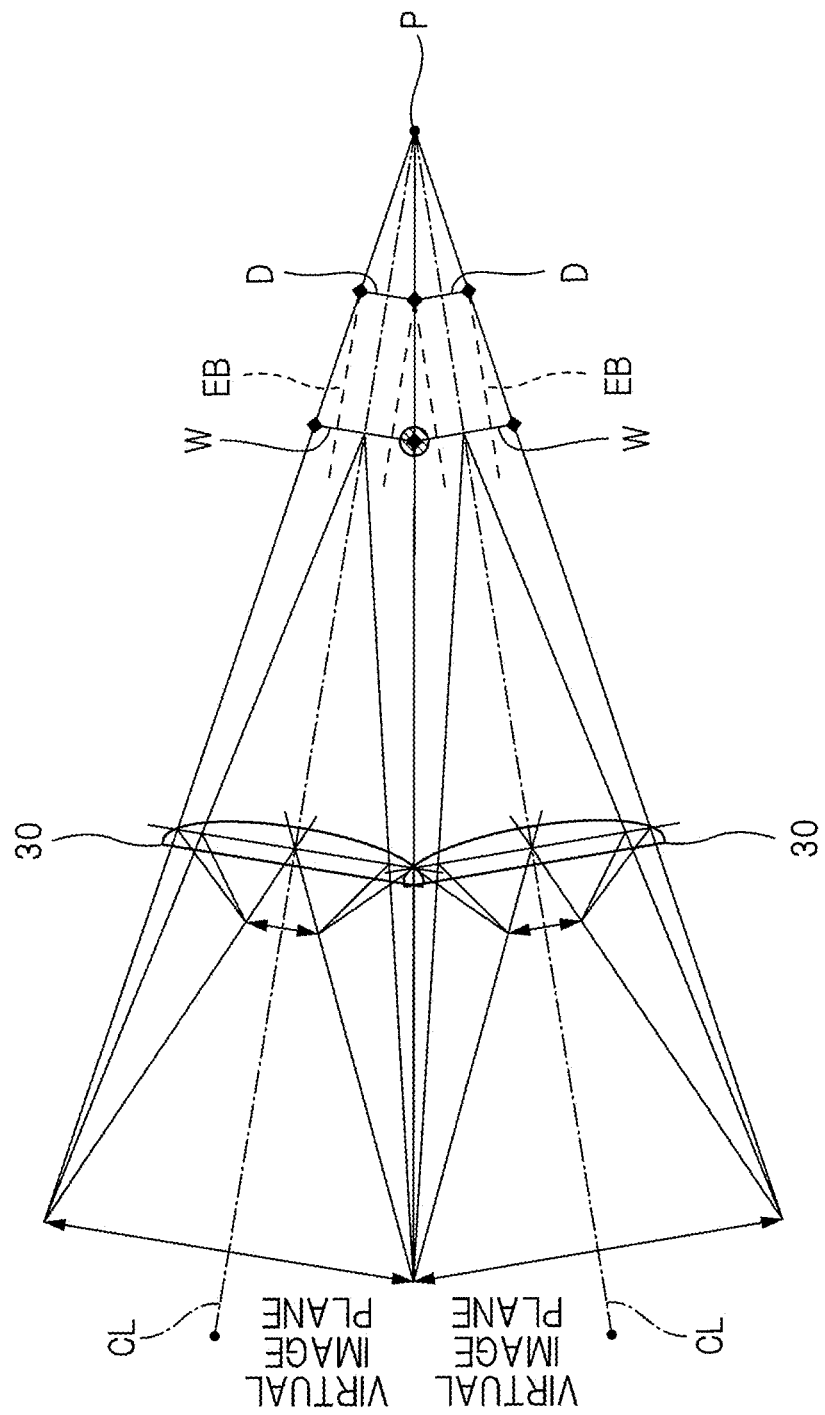
FIG. 11 is an explanatory diagram showing an example in which two convex lenses in FIG. 10 are installed at an angle.

FIG. 11 an explanatory diagram showing an example in which the two convex lenses 30 in FIG. 10 are installed at an angle.

When the flat surfaces of the two convex lenses 30 are installed at a certain angle, the two eye boxes EB can be overlapped at one point (indicated by hatching in FIG. 11) although the visual recognition range of the virtual image is limited.

As shown in FIG. 11, the two eye boxes EB can be overlapped with each other by installing the convex lenses 30 at a certain angle. Therefore, by limiting the installation requirements of the two convex lenses 30 to be installed, the two eye boxes EB can be overlapped in a wider range.

Figure 12:
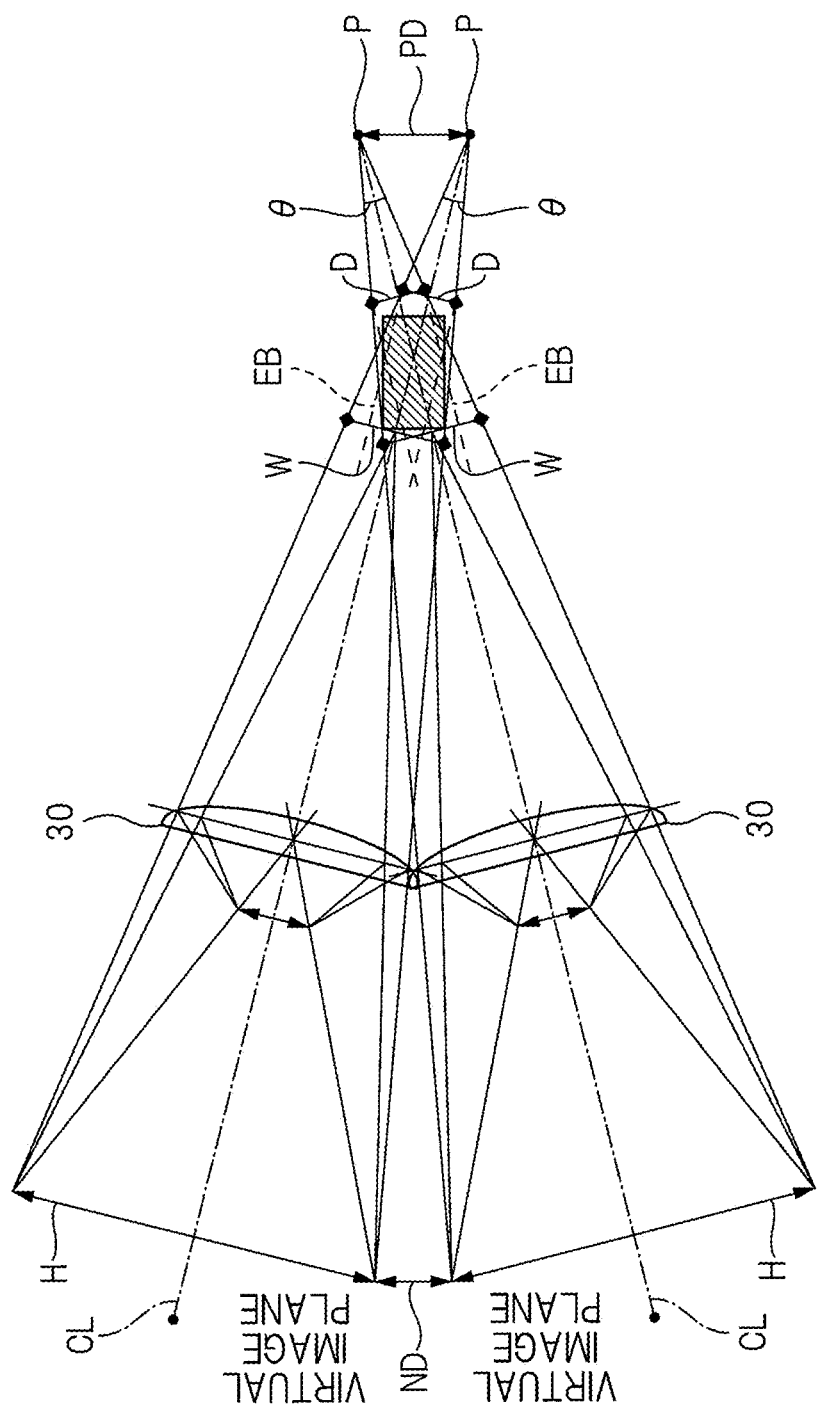
FIG. 12 is an explanatory diagram showing an installation example of two HUDs 100 provided in the HUD system according to the first embodiment.

FIG. 12 is an explanatory diagram showing an installation example of the two HUDs 100 provided in the HUD system according to the first embodiment.

In the example shown in FIG. 11, since the region in which the two eye boxes EB are overlapped is just one point (point indicated by hatching in FIG. 11), the visual recognition with both eye is impossible.

Thus, the example in FIG. 12 shows the technique in which the region in which the two eye boxes EB are overlapped, that is, the visual recognition region of the virtual image is expanded by installing the two convex lenses 30 so as to satisfy the requirements when installing the two convex lenses 30, that is, the installation requirements, thereby making it possible to visually recognize the virtual image with both eyes.

The two convex lenses 30 are installed so as to satisfy the installation requirements shown by the following expressions 1 and 2.

$$\phi = \theta + \alpha \quad \text{(Expression 1)}$$

here, $\alpha = \arctan(W/2L)$ $$PD = L(M - L(W-D)/(H-W))/W \quad \text{(Expression 2)}$$

In the expressions 1 and 2, $\phi$ indicates an angle formed between the two center lines CL intersecting in the two convex lenses 30. One of the two center lines CL serves as a first center line, and the other center line CL serves as a second center line.

$\theta$ indicates an angle of view of the virtual emission point P, and W indicates the eye box width. L indicates a distance from the eye point to the virtual image plane, and PD indicates a distance between the virtual emission points P in the two HUDs 100. M indicates a distance from the eye point to a point where the virtual image cannot be seen, and D indicates an interval between both eyes. H indicates a length of the virtual image plane on which the virtual image is displayed, in the width direction. Here, the width of the virtual image plane corresponds to that in the width direction of the vehicle 1. The meaning of these characters is as shown in FIG. 7. The same applies to expressions 3 to 9 below.

When the two HUDs 100 are installed according to the installation requirements by the expressions 1 and 2 above, the eye boxes EB of the two HUDs 100 can be overlapped with each other. Here, the region in which the eye boxes EB of the two HUDs 100 are overlapped with each other is indicated by hatching in FIG. 12. One of the two HUDs 100 is a first head up display, and the other HUD 100 is a second head up display.

However, the display region of the virtual image (virtual image plane) displayed by one HUD and the display region of the virtual image (virtual image plane) displayed by the other HUD are separated, and as a result, a non-display region ND in which no virtual image is displayed is formed between the two virtual image planes.

Figure 13:
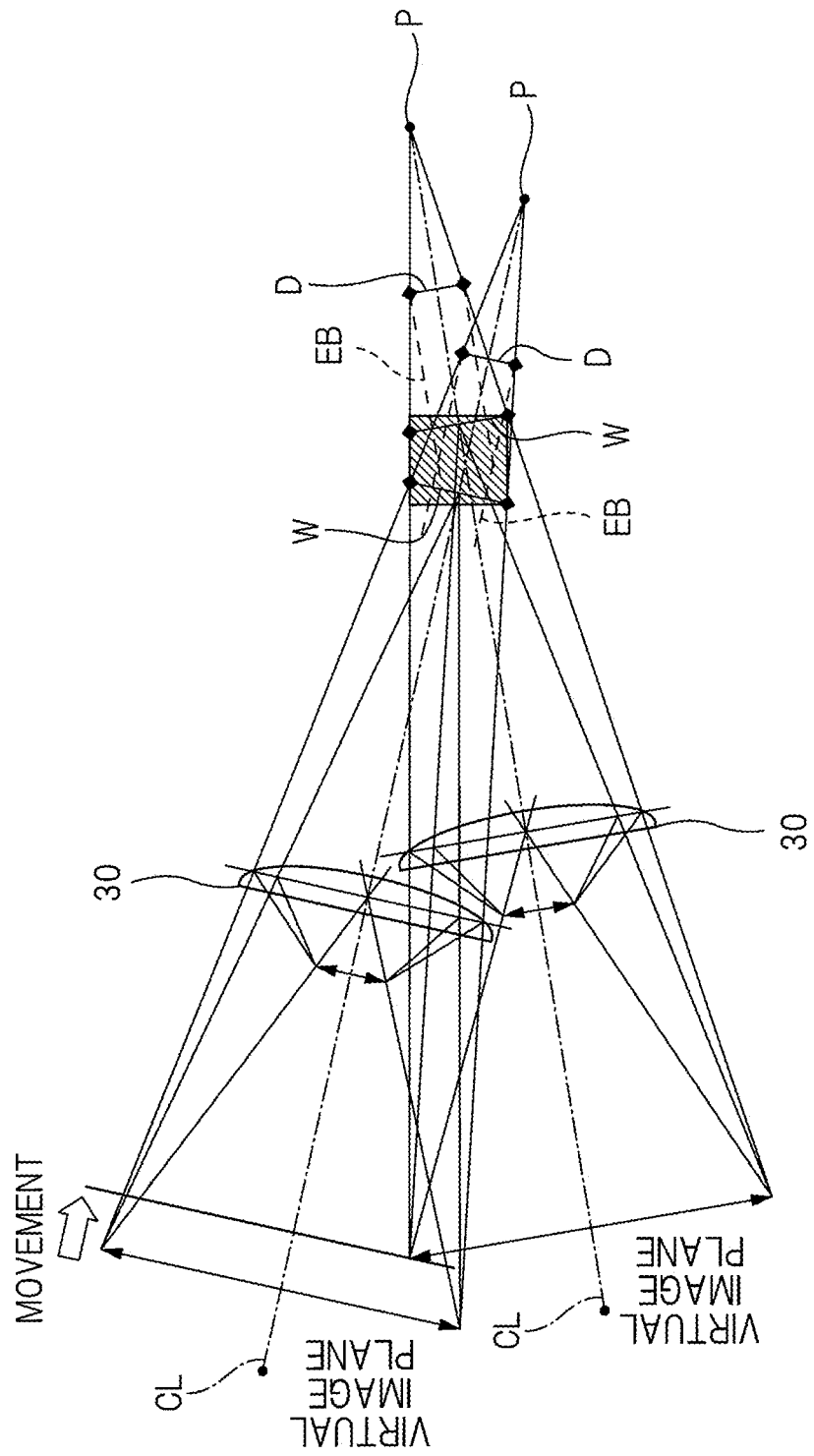
FIG. 13 is an explanatory diagram showing another installation example of the two HUDs 100 shown in FIG. 12.

FIG. 13 is an explanatory diagram showing another installation example of the two HUDs 100 shown in FIG. 12.

FIG. 13 shows an example in which the two HUDs 100 are installed so as not to form the non-display region ND in FIG. 12.

In this case, the two HUDs 100 do not have the same configuration, and the HUDs 100 different in the distance from the eye point to the virtual image plane are used. The two HUDs 100 are installed so as to be shifted in a front-rear direction of the vehicle 1 as shown in FIG. 13.

When the two HUDs 100 are installed so as to be shifted in the front-rear direction of the vehicle 1, there is a fear that the display position of the virtual image (position of the virtual image plane) may deviate or the image size of the virtual image may vary. In order to correct them, for example, the distance from the image display apparatus 2 to the mirror 3 in FIG. 4 is adjusted, or a display distance adjusting mechanism is provided in the HUD 100. The display distance adjusting mechanism adjusts the distance from the driver to the displayed virtual image based on, for example, the instruction from the ECU 11 in FIG. 2. In addition, in order to seamlessly display the virtual images displayed by the two HUDs 100, a signal processor that adjusts the display position and the display region of the virtual image is provided in the controller 10 in FIG. 2.

When the display positions of the virtual images of the two HUDs 100 differ as described above, in other words, when the optical magnification differs, luminances of the virtual images become uneven. Therefore, a luminance cooperative adjusting unit or the like is provided in the controller 10 in FIG. 2 to adjust the luminance of the two HUDs 100. The luminance cooperative adjusting unit controls the light source adjusting unit 15 so that the two HUDs 100 have the substantially same luminance.

Accordingly, it is possible to eliminate the non-display region ND in which the virtual image is not displayed, while overlapping the eye boxes EB of the two HUDs 100.

Figure 14:
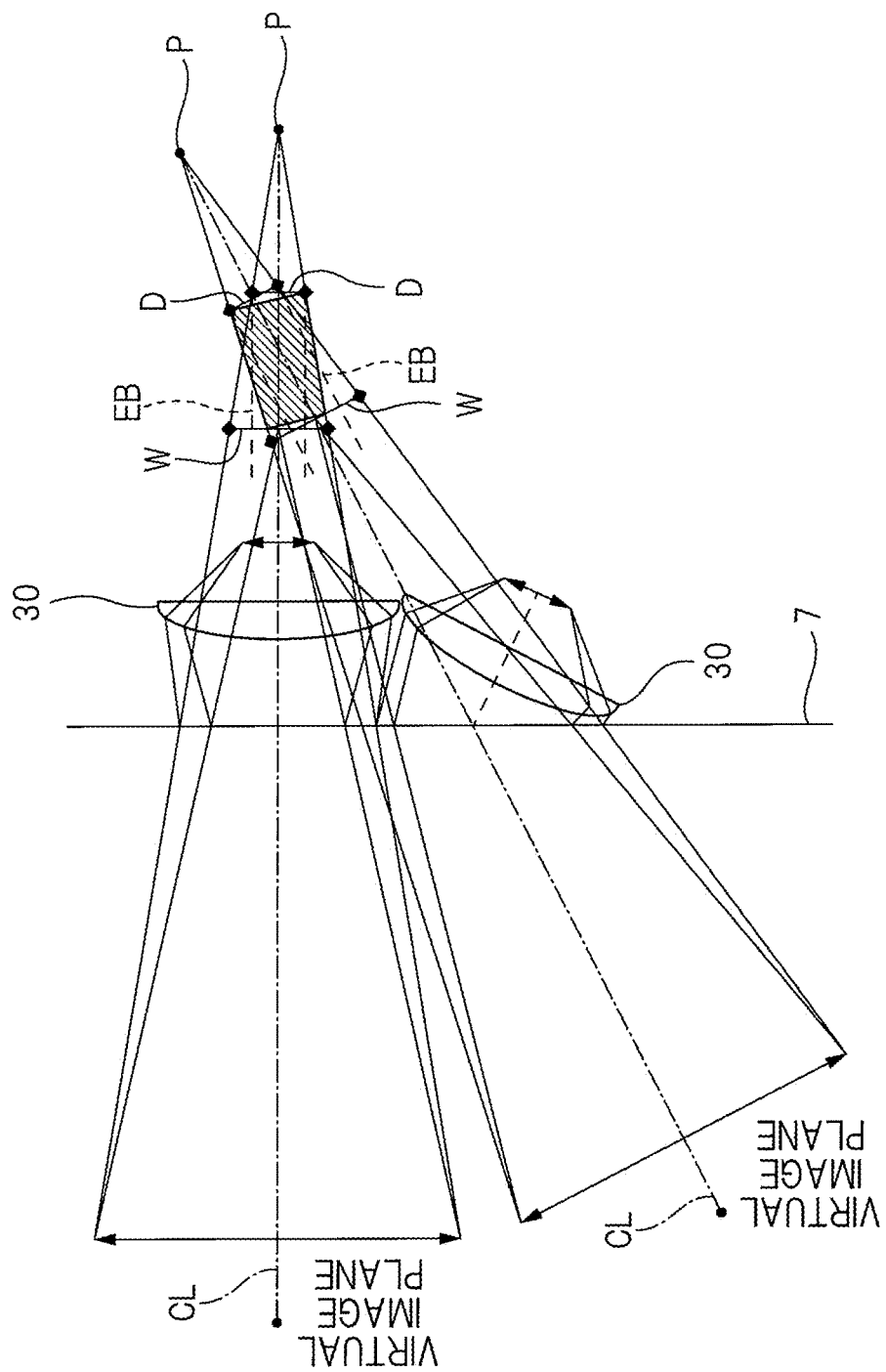
FIG. 14 is an explanatory diagram showing an installation example of the two HUDs 100 shown in FIG. 12 in a vehicle 1.

FIG. 14 is an explanatory diagram showing an installation example of the two HUDs 100 shown in FIG. 12 in the vehicle 1.

FIG. 14 shows an example in which the two HUDs 100 are installed in the vehicle 1 according to the installation requirements by the expressions 1 and 2 described with reference to FIG. 12. Namely, FIG. 14 shows an example in which the image light projected through the mirror 3 in FIG. 4 is reflected by the windshield 7 of the vehicle 1.

In this case, the convex lens 30 (corresponding to the mirror 3 in FIG. 4) in one HUD 100 (first head up display) is installed so as to be parallel with the windshield 7, and the convex lens 30 (similarly corresponding to the mirror 3 in FIG. 4) of the other HUD 100 (second head up display) is installed at an angle with respect to the windshield 7.

In other words, in the installation requirements in the example shown in FIG. 14, the optical axis of one HUD 100, in other words, the optical center line of the HUD 100 is arranged so as to enter the windshield 7 at an approximately right and reach the eyes 8 of the driver, that is, the pupil positions of the driver.

Also, the optical axis (optical center line) of the other HUD 100 is arranged so as to enter the windshield 7 at an angle other than a right angle and reach the eyes 8 of the driver, that is, the pupil positions of the driver. Further, the other HUD 100 is installed at a position closer to the windshield 7 than the one HUD 100 is. Here, the optical center line CL of the one HUD 100 serves as a first center line, and the optical center line CL of the other HUD 100 serves as a second center line.

Accordingly, as shown in FIG. 14, the two convex lenses 30 can be installed without being in contact with each other. Namely, the display region of the virtual image can be expanded without contacting the mirrors 3 (FIG. 4) provided in the two HUDs 100 with each other.

In this way, by the installation that satisfies the installation requirements described above, the size reduction in the width direction of the vehicle 1 can be achieved in comparison with the case where the two HUDs 100 are simply installed in the width direction of the vehicle 1, and thus the accommodability of the HUD system can be improved. Further, since the virtual image plane is formed by the two HUDs 100, the display range of the virtual image can be greatly expanded.

As described above, it is possible to realize the highly convenient HUD system with improved accommodability, while expanding the display range of the virtual image.

Second Embodiment

<Outline>

In FIG. 13 of the first embodiment, the example in which the two convex lenses 30 are shifted in the front-rear direction of the vehicle 1 so as to prevent the formation of the non-display region ND has been described. Meanwhile, in a second embodiment, another installation example of the two convex lenses 30 capable of preventing the formation of the non-display region ND will be described.

<Installation Example of HUD>

Figure 15:
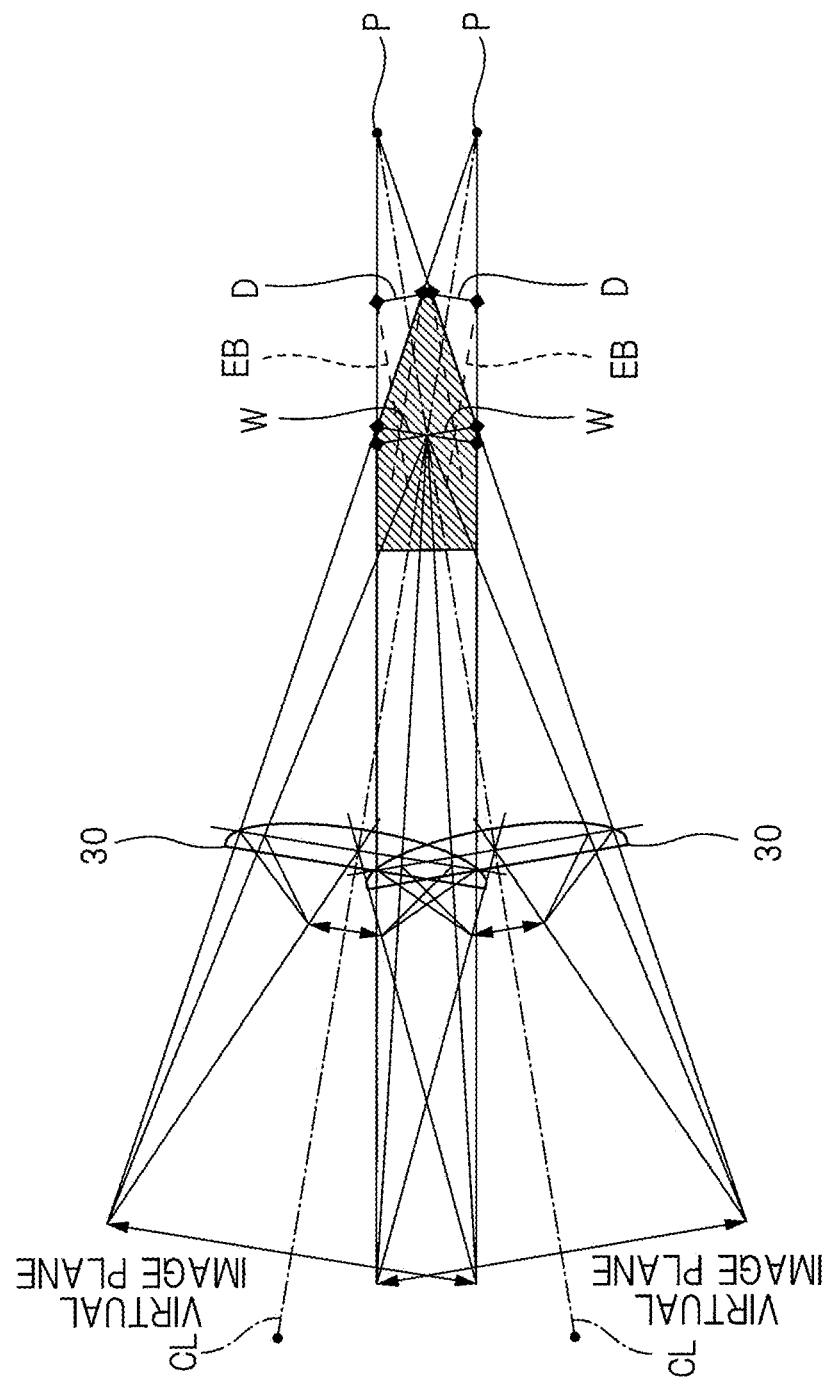
FIG. 15 is an explanatory diagram showing an installation example of two HUDs according to a second embodiment.

FIG. 15 is an explanatory diagram showing an installation example of two HUDs 100 according to the second embodiment.

FIG. 15 shows an example in which the two convex lenses 30 are installed so as to be shifted in the vertical direction of the vehicle 1, that is, in the top-bottom direction to eliminate the non-display region ND.

In the case of this installation example, the two convex lenses 30 are installed so as to satisfy the installation requirements shown by the following expressions 3 and 4.

$$\phi=\theta \quad \text{(Expression 3)}$$

$$PD=W \quad \text{(Expression 4)}$$

In the expressions 3 and 4 above, φ indicates an angle formed between the two center lines CL intersecting in the two convex lenses 30, and θ indicates an angle of view of the virtual emission point P. PD indicates a distance between the virtual emission points P in the two HUDs 100, and W indicates the eye box width.

By installing the two convex lenses 30, that is, the mirrors 3 of FIG. 4 so as to be shifted in the vertical direction of the vehicle 1 while satisfying the requirements by the expressions 3 and 4, the formation of the non-display region ND can be prevented as shown in FIG. 15 while securing approximately the same region in which the eye boxes EB are overlapped as that in the case of FIG. 13.

Further, not only the non-display region ND can be eliminated, but also parts of the display regions of the virtual image displayed by the two HUDs 100 (parts of two virtual image planes) can be overlapped with each other as shown in FIG. 15.

By overlapping the two display regions as described above, for example, the virtual image can be continuously displayed without lacking when displaying the virtual image so as to flow from the display region of the one HUD 100 to the display region of the other HUD 100.

<Another Installation Example of HUD>

Figure 16:
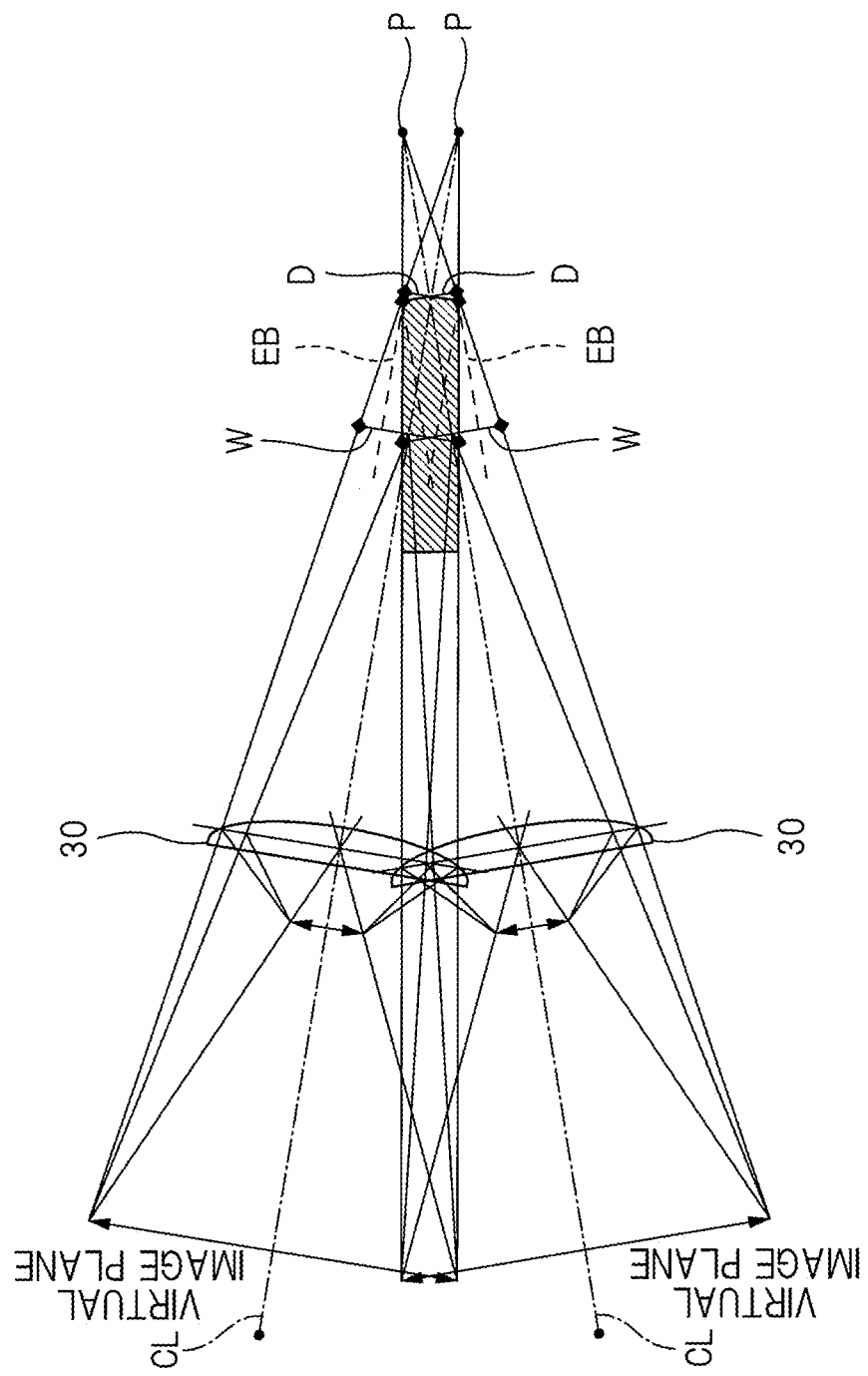
FIG. 16 is an explanatory diagram showing another installation example of the two HUDs shown in FIG. 15.

FIG. 16 is an explanatory diagram showing another installation example of the two HUDs 100 shown in FIG. 15.

FIG. 15 shows the case in which the non-display region ND is eliminated while securing approximately the same region in which the eye boxes EB are overlapped as that in the case of FIG. 13. Meanwhile, FIG. 16 shows an example in which the visual recognition range of the virtual image with both eyes is expanded in comparison with the visual recognition range in FIG. 13 instead of the region in which the eye boxes EB are overlapped. This enables to expand the visual recognition range of the virtual image with both eyes.

In this case, the two convex lenses 30 are installed so as to satisfy the installation requirements by the expression 3 above and the expression 5 below.

$$PD=D \quad \text{(Expression 5)}$$

Here, PD indicates a distance between the virtual emission points P of the two HUDs 100, and D indicates an interval between both eyes.

Also in this case, not only the non-display region ND can be eliminated, but also parts of the display regions of the virtual image displayed by the two HUDs 100 can be overlapped with each other as shown in FIG. 16, and the virtual image can be continuously displayed without lacking.

As described above, it is possible to realize the highly convenient HUD system with improved accommodability, while expanding the display range of the virtual image. In addition, it is possible to continuously display the virtual image in a wide range without lacking.

Third Embodiment

<Outline>

In the second embodiment, the example in which parts of the two display regions of the virtual image are overlapped with each other has been described. Meanwhile, in a third embodiment, an example in which the two display regions are not overlapped with each other while eliminating the non-display region ND will be described.

<Installation Example of HUD>

Figure 17:
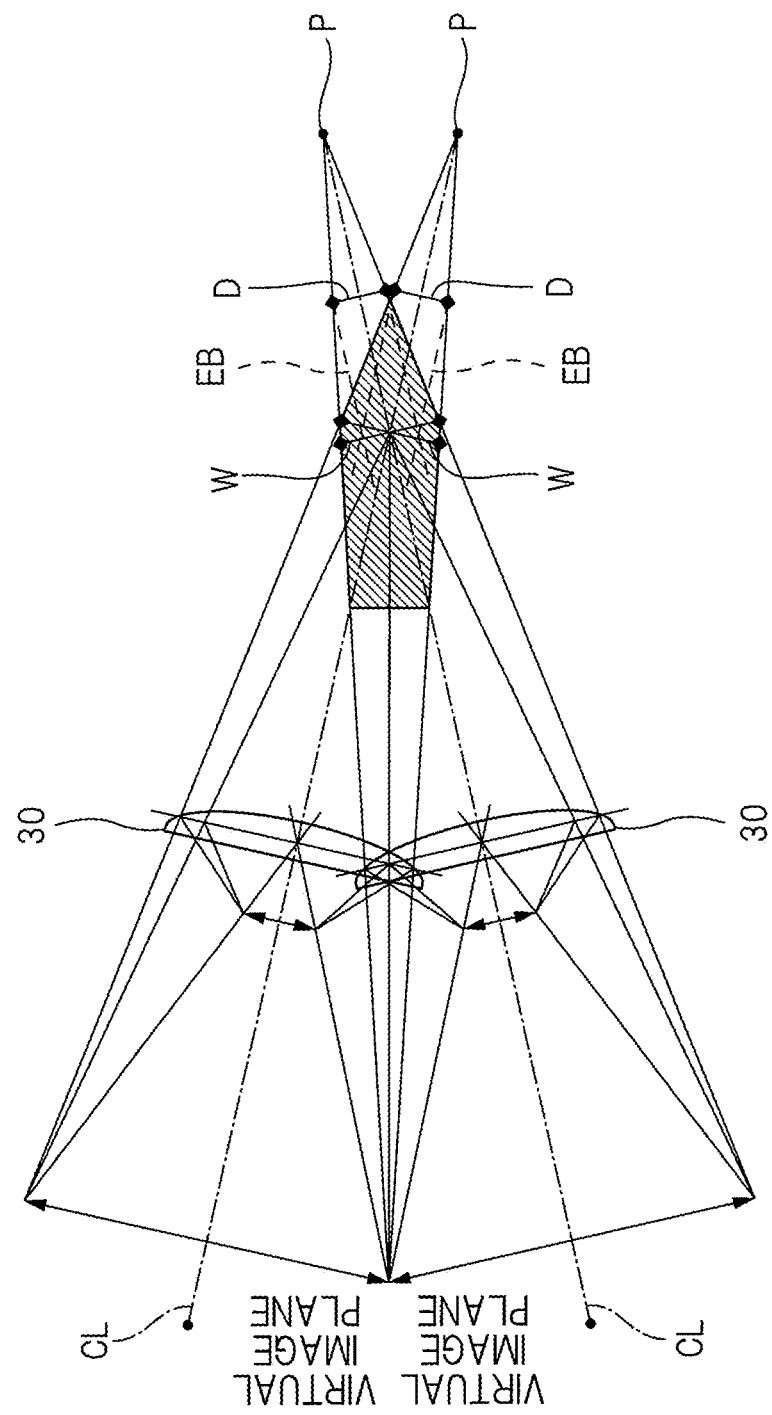
FIG. 17 is an explanatory diagram showing an installation example of two HUDs according to a third embodiment.

FIG. 17 is an explanatory diagram showing an installation example of two HUDs 100 according to the third embodiment.

When displaying the virtual image, it is not always the case that the virtual image continuously extending over the two display regions is displayed. Also, it is not necessary to display the virtual image without lacking in some cases. In such cases, the overlapping of the two display regions according to the second embodiment described above is unnecessary.

FIG. 17 shows an example in which the two display regions are brought close to each other so as not to form the non-display region ND, and the non-display region ND is eliminated by installing the two convex lenses 30 so as to be shifted in the vertical direction of the vehicle 1, that is, in the top-bottom direction as in FIG. 15 of the second embodiment.

In the case of this installation example, the two convex lenses 30 are installed so as to satisfy the installation requirements shown by the following expressions 6 and 7.

$$\varphi = \theta + \beta \quad \text{(Expression 6)}$$

here, $\beta = \arctan(W/2L)$ $$PD = D \quad \text{(Expression 7)}$$

In the expressions 6 and 7, $\varphi$ indicates an angle formed between the two center lines CL, $\theta$ indicates an angle of view of the virtual emission point P, and W indicates the eye box width. L indicates a distance from the eye point to the virtual image plane. PD indicates a distance between the virtual emission points P in the two HUDs 100, and D indicates an interval between both eyes.

Accordingly, by installing the two convex lenses 30, that is, the mirrors 3 of FIG. 4 so as to be shifted in the vertical direction of the vehicle 1 while satisfying the installation requirements by the expressions 6 and 7, the non-display region ND can be eliminated as shown in FIG. 17 while securing approximately the same region in which the eye boxes EB are overlapped as that in the case of FIG. 13.

As described above, it is possible to realize the highly convenient HUD system with improved accommodability, while eliminating the non-display region ND and expanding the display range of the virtual image.

<Another Installation Example of HUD>

Figure 18:
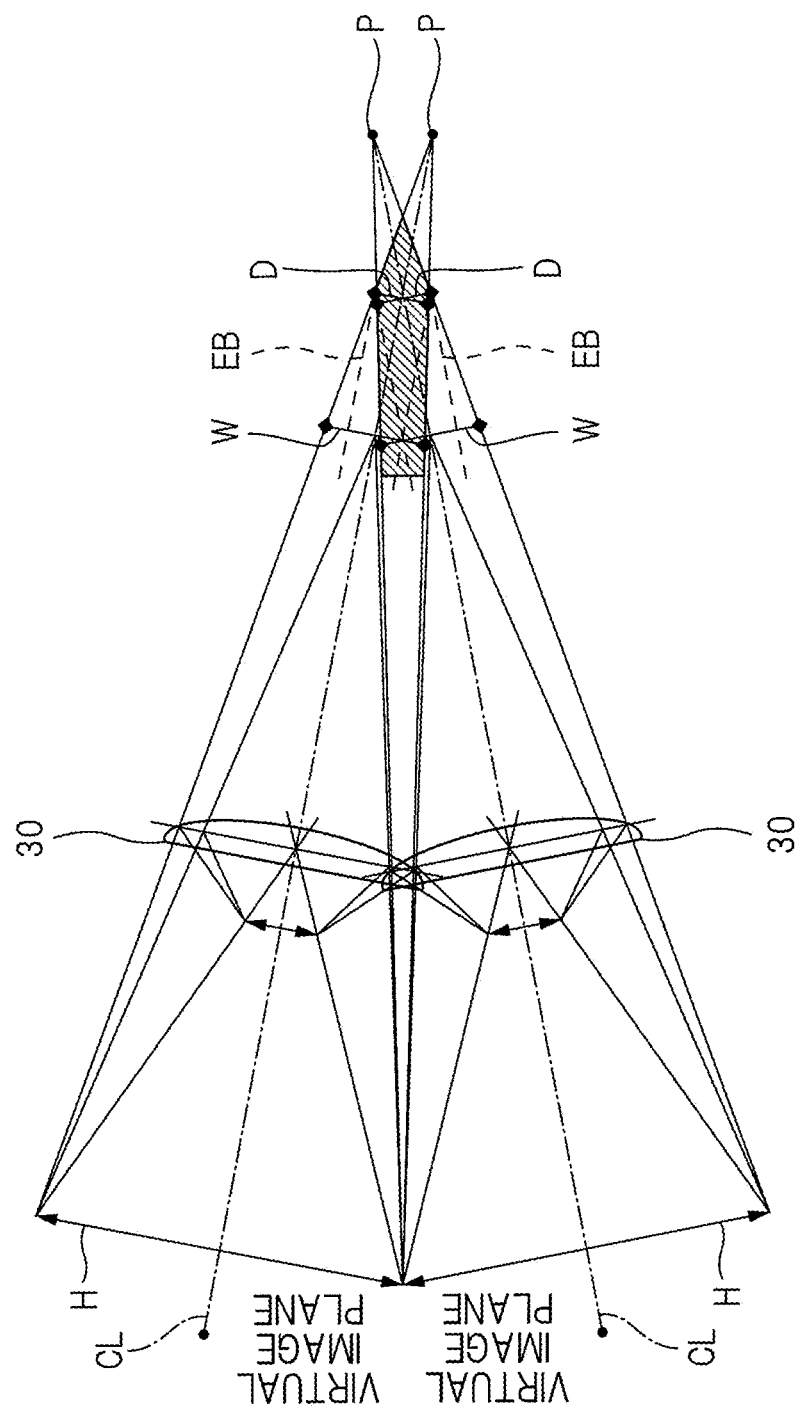
FIG. 18 is an explanatory diagram showing another installation example of the two HUDs shown in FIG. 17.

FIG. 18 is an explanatory diagram showing another installation example of the two HUDs 100 shown in FIG. 17.

FIG. 17 shows the case in which the non-display region ND is eliminated while securing approximately the same region in which the eye boxes EB are overlapped as that in the case of FIG. 13. Meanwhile, FIG. 18 shows an example in which the visual recognition range of the virtual image with both eyes is expanded in comparison with the visual recognition range in FIG. 13 instead of the region in which the eye boxes EB are overlapped. This enables to further expand the visual recognition range of the virtual image with both eyes.

In this case, the two convex lenses 30 are installed so as to satisfy the installation requirements shown by the following expressions 8 and 9.

$$\varphi = \theta + \gamma \quad \text{(Expression 8)}$$

here, $\gamma = \arctan(W/2L(1+(W-D)/(H-W))$ $$PD = Z \quad \text{(Expression 9)}$$

here, $Z = 2LM/W$

In the expressions 8 and 9, $\varphi$ indicates an angle formed between the two center lines CL, $\theta$ indicates an angle of view of the virtual emission point P, and W indicates the eye box width. L indicates a distance from the eye point to the virtual image plane. H indicates a length of the virtual image plane on which the virtual image is displayed in the width direction (width direction of the vehicle 1), that is, a virtual image width in the horizontal direction in which the driver visually recognizes the virtual image 9. PD indicates a distance between the virtual emission points P of the two HUDs 100, and M indicates a distance from the eye point to a point where the virtual image cannot be seen.

Also in this case, it is possible to realize the highly convenient HUD system with improved accommodability, while eliminating the non-display region ND and expanding the display range of the virtual image.

In the foregoing, the invention made by the inventor of the present invention has been concretely described based on the embodiments. However, it is needless to say that the present invention is not limited to the foregoing embodiments and various modifications and alterations can be made within the scope of the present invention.

Note that the present invention is not limited to the embodiments described above, and includes various modification examples. For example, the above embodiments have described the present invention in detail in order to make the present invention easily understood, and the present invention is not necessarily limited to those having all the described configurations.

Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

REFERENCE SIGNS LIST 1 vehicle
2 image display apparatus
3 mirror
3b mirror
3a mirror
4 mirror driver
5 vehicle information acquisition unit
6 speaker
7 windshield
8 eye
9 virtual image
10 controller
11 ECU
12 audio output unit
13 non-volatile memory
14 memory
15 light source adjusting unit
16 distortion correcting unit
17 display element driver
18 mirror adjusting unit
19 gravity center calculating unit
21 light source
22 illumination optical system
23 display element
30 convex lens
50 vehicle information
101 vehicle speed sensor
102 shift position sensor
103 steering wheel angle sensor
104 headlight sensor
105 illuminance sensor
106 chromaticity sensor
107 distance sensor
108 infrared sensor
109 engine start sensor
110 acceleration sensor 111 gyro sensor
112 temperature sensor
113 road-vehicle communication radio receiver
114 inter-vehicle communication radio receiver
117 GPS receiver
118 VICS receiver
119 load sensor
120 position sensor
121 HUD display On/Off sensor
122 HUD mirror adjusting sensor

The invention claimed is:

1. A head up display system for a vehicle, the system including a first head up display and a second head up display,
wherein the first and second head up displays are installed so that an angle $\phi$ at which a first center line which is an optical center line of the first head up display and a second center line which is an optical center line of the second head up display intersect is $\phi=\theta+\alpha$ and a distance PD between a first virtual emission point which is a virtual image emission point of the first head up display and a second virtual emission point which is a virtual image emission point of the second head up display is PD=L(M−L(W−D)/(H−W))/W, the $\alpha$ is $\alpha$=arctan (W/2L), the $\theta$ is an angle of view of the first virtual emission point and an angle of view of the second virtual emission point, the W is a length of an eye box in a width direction of the vehicle, the L is a distance from an eye point to a virtual image plane, the M is a distance from the eye point to a point where a virtual image cannot be seen, the D is an interval between both eyes, and the H is a length of the virtual image plane on which the virtual image is displayed, in the width direction of the vehicle.

2. The head up display system according to claim 1, wherein the first head up display is installed so that the first center line reaches pupil positions of a driver from front with respect to a reflecting surface of a windshield or a combiner, and
wherein the second head up display is installed so that the second center line enters at an angle other than from the front with respect to the reflecting surface of the windshield or the combiner and reaches the pupil positions of the driver.

3. The head up display system according to claim 1, wherein the first and second head up displays are installed so that an optical center line of the first head up display reaches pupil positions of a driver from front with respect to a reflecting surface of a windshield or a combiner and an optical center line of the second head up display enters at an angle different from the optical center line of the first head up display in a driver to front passenger horizontal direction of the vehicle with respect to the reflecting surface of the windshield or the combiner and reaches the pupil positions of the driver.

4. A head up display system for a vehicle, the system including a first head up display and a second head up display,
wherein the first and second head up displays are installed so that an angle $\phi$ at which a first center line which is an optical center line of the first head up display and a second center line which is an optical center line of the second head up display intersect is $\phi=\theta$ and a distance PD between a first virtual emission point which is a virtual image emission point of the first head up display and a second virtual emission point which is a virtual image emission point of the second head up display is PD=W, the $\theta$ is an angle of view of the first virtual emission point and an angle of view of the second virtual emission point, and the W is a length of an eye box with which a virtual image can be visually recognized, in a width direction of the vehicle.

5. A head up display system for a vehicle, the system including a first head up display and a second head up display,
wherein the first and second head up displays are installed so that an angle $\phi$ at which a first center line which is an optical center line of the first head up display and a second center line which is an optical center line of the second head up display intersect is $\phi=\theta$ and a distance PD between a first virtual emission point which is a virtual image emission point of the first head up display and a second virtual emission point which is a virtual image emission point of the second head up display is PD=D, the $\theta$ is an angle of view of the first virtual emission point and an angle of view of the second virtual emission point, and the D is an interval between both eyes.

6. A head up display system for a vehicle, the system including a first head up display and a second head up display,
wherein the first and second head up displays are installed so that an angle $\phi$ at which a first center line which is an optical center line of the first head up display and a second center line which is an optical center line of the second head up display intersect is $\phi=\theta+\beta$ and a distance PD between a first virtual emission point which is a virtual image emission point of the first head up display and a second virtual emission point which is a virtual image emission point of the second head up display is PD=D, the $\beta$ is $\beta$=arctan (W/2L), the $\theta$ is an angle of view of the first virtual emission point and an angle of view of the second virtual emission point, the W is a length of an eye box in a width direction of the vehicle, the L is a distance from an eye point to a virtual image plane, and the D is an interval between both eyes.

* * * * *